(12) United States Patent
Nelson et al.

(10) Patent No.: US 6,904,060 B2
(45) Date of Patent: Jun. 7, 2005

(54) SYSTEM AND METHOD FOR TRANSPORTING A CALL IN A TELECOMMUNICATION NETWORK

(75) Inventors: Tracy Lee Nelson, Shawnee Mission, KS (US); William Lyle Wiley, Olathe, KS (US); Albert Daniel DuRee, Independence, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 09/790,114

(22) Filed: Feb. 20, 2001

(65) Prior Publication Data

US 2001/0015981 A1 Aug. 23, 2001

Related U.S. Application Data

(63) Continuation of application No. 09/080,393, filed on May 18, 1998, now Pat. No. 6,262,992, which is a continuation of application No. 08/754,846, filed on Nov. 22, 1996, now abandoned.

(51) Int. Cl.[7] .......................... H04J 3/12; H04L 12/66; H04L 12/56; H04M 3/42
(52) U.S. Cl. ...................... 370/526; 370/352; 370/401; 370/466; 379/207.02
(58) Field of Search .................................. 370/352–356, 370/426, 463, 466, 524, 395.1, 400–410, 522, 525–526; 379/88.17, 58.24, 88.14, 229, 58.25, 230, 88.26, 201, 207, 67, 68, 93.12, 207.1, 207.2, 204.01, 205.01, 215.01; 320/259–262

(56) References Cited

U.S. PATENT DOCUMENTS

| 4,028,495 A | 6/1977 | Funamo et al. |
|---|---|---|
| 4,379,950 A | 4/1983 | Ahmed |
| 4,720,850 A | 1/1988 | Oberlander et al. |
| 4,736,364 A | 4/1988 | Basso et al. |

(Continued)

FOREIGN PATENT DOCUMENTS

| EP | 0711052 A1 | 5/1996 |
|---|---|---|
| HU | 198808 B | 6/1985 |
| HU | 215038 B | 5/1995 |

OTHER PUBLICATIONS

Bauer, Helen, A.; Kulzer, John J.; Sable, Edward G., "Designing Service–Independent Capabilities for Intelligent Networks," IEEE Communications Magazine, Dec. 1988, pp. 31–41.

*Primary Examiner*—Steven Nguyen

(57) ABSTRACT

A system and method to detect a call trigger during a call without requiring a service platform to remain connected to the call. A first communication device transmits a call having call signaling and user communications. A signaling processor receives the call signaling from the first communication device and selects a connection to a second communication device. An interworking unit receives the user communications from the first communication device and converts the user communications from a time division multiplex format to asynchronous transfer mode cells that identify a selected connection to the second communication device and transports the user communications to the second communication device. The interworking unit detects a call trigger in the user communications. The interworking unit transmits call trigger data to the signaling processor. The signaling processor processes the call trigger data and, upon validating the call trigger, instructs the interworking unit to transport the user communications to a third communication device. In response thereto, the interworking unit converts the user communications to asynchronous transfer mode cells that identify the selected connection to the third communication device and transports the user communications to the third communication device.

22 Claims, 12 Drawing Sheets

U.S. PATENT DOCUMENTS

| | | | |
|---|---|---|---|
| 4,763,317 A | | 8/1988 | Lehman et al. |
| 4,926,416 A | | 5/1990 | Weik |
| 5,051,983 A | | 9/1991 | Kammerl |
| 5,115,427 A | | 5/1992 | Johnson, Jr. et al. |
| 5,193,110 A | | 3/1993 | Jones et al. |
| 5,204,857 A | | 4/1993 | Obara |
| 5,327,421 A | | 7/1994 | Hiller et al. |
| 5,345,445 A | | 9/1994 | Hiller et al. |
| 5,375,124 A | | 12/1994 | D'Ambrogio et al. |
| 5,422,882 A | | 6/1995 | Hiller et al. |
| 5,434,852 A | | 7/1995 | LaPorta et al. |
| 5,434,981 A | | 7/1995 | Lenihan et al. |
| 5,444,713 A | | 8/1995 | Backaus et al. |
| 5,483,527 A | | 1/1996 | Doshi et al. |
| 5,509,010 A | | 4/1996 | La Porta et al. |
| 5,526,359 A | | 6/1996 | Read et al. |
| 5,537,461 A | * | 7/1996 | Bridges et al. ........... 379/88.17 |
| 5,539,884 A | * | 7/1996 | Robrock, II ........... 379/114.01 |
| 5,541,917 A | | 7/1996 | Farris |
| 5,568,475 A | | 10/1996 | Doshi et al. |
| 5,572,583 A | | 11/1996 | Wheeler, Jr. et al. |
| 5,587,999 A | | 12/1996 | Endo |
| 5,619,561 A | * | 4/1997 | Reese ................... 379/205.01 |
| 5,623,491 A | | 4/1997 | Skoog |
| 5,625,675 A | * | 4/1997 | Katsumaru et al. ...... 379/88.17 |
| 5,703,876 A | | 12/1997 | Christie |
| 5,708,702 A | | 1/1998 | DePaul et al. |
| 5,721,763 A | * | 2/1998 | Joseph et al. ............ 379/88.04 |
| 5,745,553 A | | 4/1998 | Mirville et al. |
| 5,771,065 A | * | 6/1998 | Hijikata et al. .......... 348/14.11 |
| 5,784,371 A | | 7/1998 | Iwai |
| 5,802,045 A | | 9/1998 | Kos et al. |
| 5,825,780 A | | 10/1998 | Christie |
| 5,825,856 A | | 10/1998 | Porter et al. |
| 5,867,571 A | | 2/1999 | Borchering |
| 5,884,262 A | | 3/1999 | Wise et al. |
| 5,892,764 A | | 4/1999 | Riemann et al. |
| 5,917,815 A | | 6/1999 | Byers et al. |
| 5,920,562 A | | 7/1999 | Christie et al. |
| 5,926,464 A | * | 7/1999 | Fraser ................... 379/205.01 |
| 5,940,393 A | | 8/1999 | Duree et al. |
| 5,943,319 A | * | 8/1999 | Fraser ................... 370/395.61 |
| 5,991,301 A | | 11/1999 | Christie |
| 5,999,594 A | * | 12/1999 | Mizoguchi et al. ...... 379/88.14 |
| 6,178,167 B1 | * | 1/2001 | Fraser ....................... 370/463 |
| 6,181,703 B1 | | 1/2001 | Christie et al. |
| 6,262,992 B1 | * | 7/2001 | Nelson et al. .............. 370/466 |
| 6,324,179 B1 | | 11/2001 | Doshi et al. |
| 6,330,224 B1 | | 12/2001 | Christie et al. |
| 6,487,200 B1 | * | 11/2002 | Fraser ....................... 370/356 |
| 6,546,003 B1 | * | 4/2003 | Farris ........................ 370/352 |
| 2001/0033564 A1 | * | 10/2001 | Hickman ................... 370/352 |

\* cited by examiner

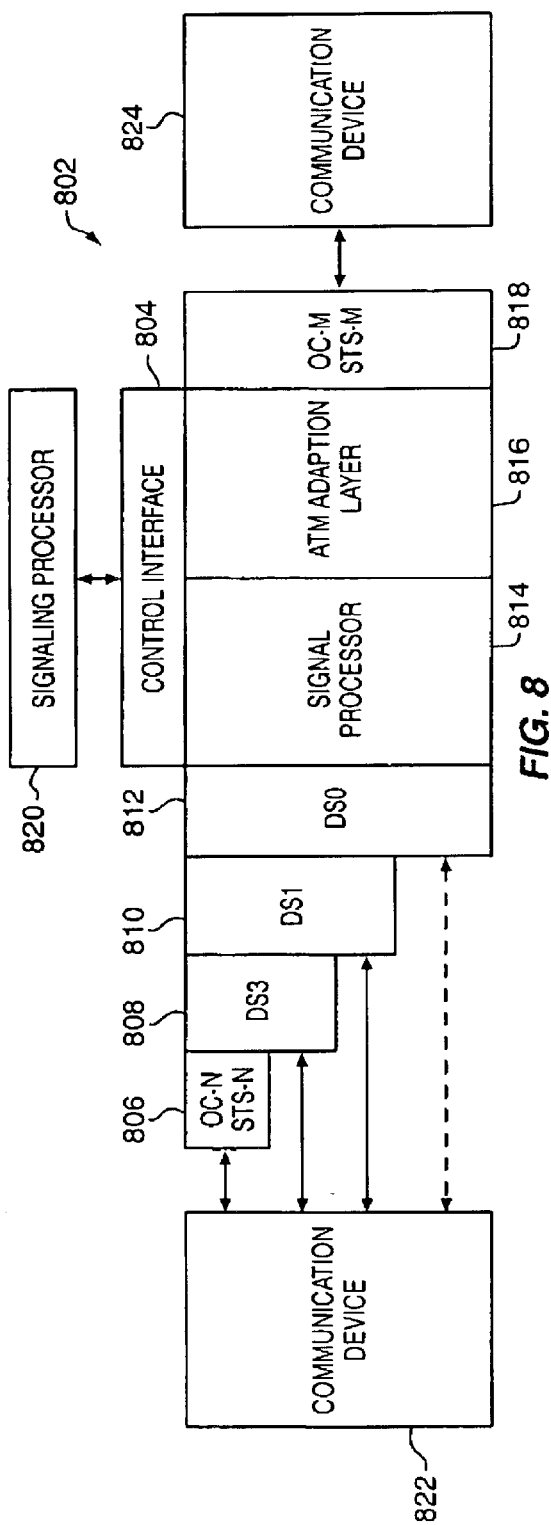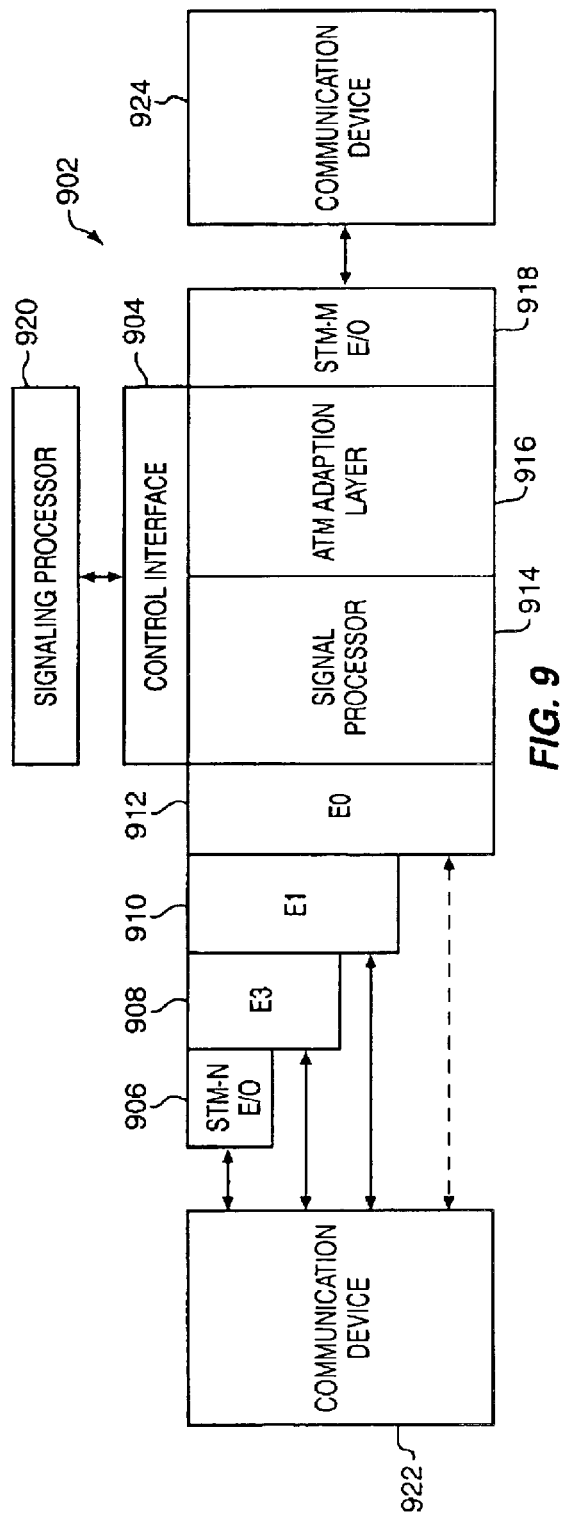

FIG. 13

| ASSOCIATED POINT CODE | CIC | VP | VC | TRUNK GROUP NUMBER | GROUP MEMBER NUMBER | HARDWARE IDENTIFIER | ECHO CANCELER | ECHO CONTROL | SATELLITE INDICATOR | CIRCUIT STATUS | CIRCUIT STATE | TIME/ DATE |
|---|---|---|---|---|---|---|---|---|---|---|---|---|
| | | | | | | | | | | | | |
| | | | | | | | | | | | | |
| | | | | | | | | | | | | |

FIG. 14

| TRUNK GROUP NUMBER | GLARE RESOLUTION | CONTINUITY CONTROL | CLLI | SATELLITE TRUNK GROUP | SERVICE INDICATOR | NPA | SEL SEQ | HOP COUNTER | ACC ACTIVE | RE-ATTEMPT CIRCUIT | DEFAULT JIP/LRN | OMI | NEXT FUNCTION | NEXT INDEX |
|---|---|---|---|---|---|---|---|---|---|---|---|---|---|---|
| | | | | | | | | | | | | | | |
| | | | | | | | | | | | | | | |
| | | | | | | | | | | | | | | |

FIG. 15

| EXCEPTION TABLE INDEX | CARRIER SELECTION IDENTIFICATION | CARRIER IDENTIFICATION | CALLED PARTY | | | NEXT FUNCTION | NEXT INDEX |
|---|---|---|---|---|---|---|---|
| | | | NATURE OF ADDRESS | DIGITS FROM | DIGITS TO | | |
| | | | | | | | |
| | | | | | | | |
| | | | | | | | |

FIG. 16

| ANI TABLE INDEX | CALLING PARTY CATEGORY | NATURE OF ADDRESS | CALLING PARTY/CHARGE NUMBER | | | ORIGINATING LINE INFORMATION | NEXT FUNCTION | NEXT INDEX |
|---|---|---|---|---|---|---|---|---|
| | | | DIGITS FROM | DIGITS TO | DATA | | | |
| | | | | | | | | |
| | | | | | | | | |

FIG. 17

| CALLED NUMBER TABLE INDEX | NATURE OF ADDRESS | DIGITS FROM | DIGITS TO | NEXT FUNCTION | NEXT INDEX |
|---|---|---|---|---|---|
| | | | | | |
| | | | | | |

FIG. 18

| ROUTING TABLE INDEX | TRANSIT NETWORK SELECTION | | | CIRCUIT CODE | NEXT FUNCTION #1 | INDEX #1 | NEXT FUNCTION #2 | INDEX #2 | NEXT FUNCTION #3 | INDEX #3 |
|---|---|---|---|---|---|---|---|---|---|---|
| | NETWORK IDENTIFICATION PLAN | DIGITS FROM | DIGITS TO | | | | | | | |
| | | | | | | | | | | |
| | | | | | | | | | | |

FIG. 19

| INDEX | MESSAGE RECEIVED CAUSE VALUE | GENERAL LOCATION | CODING STANDARD | CAUSE VALUE | NEXT FUNCTION | INDEX |
|---|---|---|---|---|---|---|
| | | | | | | |
| | | | | | | |

| MESSAGE TYPE | PARAMETERS | INDEX #1 | INDEX # ... | INDEX #N |
|---|---|---|---|---|
| ADDRESS COMPLETE | BACKWARD CALL INDICATOR | | | |
| | ACCESS TRANSPORT | | | |
| | CAUSE INDICATOR | | | |
| | OPTIONAL BACKWARD CALL INDICATORS | | | |
| | OPTIONAL "FE" INDICATOR | | | |
| ANSWER | ACCESS TRANSPORT | | | |
| | BACKWARD CALL INDICATOR | | | |
| CALL PROGRESS | EVENT INFORMATION | | | |
| | BACKWARD CALL INDICATOR | | | |
| | ACCESS TRANSPORT | | | |
| | CAUSE INDICATOR | | | |
| | OPTIONAL BACKWARD CALL INDICATORS | | | |
| CIRCUIT RESERVATION | NATURE OF CONNECTION INDICATOR | | | |
| CIRCUIT RESERVATION ACK | N/A | | | |
| CONFUSION | N/A | | | |
| CONTINUITY | CONTINUITY INDICATOR | | | |
| EXIT | OUTGOING TRUNK GROUP NUMBER | | | |
| INFORMATION | ALL PARAMETERS | | | |
| INFORMATION REQUEST | ALL PARAMETERS | | | |
| INITIAL ADDRESS | NATURE OF CONNECTION INDICATOR | | | |
| | FORWARD CALL INDICATOR | | | |
| | CALLING PARTY'S CATEGORY | | | |
| | USER SERVICE INFORMATION | | | |
| | CALLED PARTY NUMBER | | | |
| | ACCESS TRANSPORT | | | |
| | CALLING PARTY NUMBER | | | |
| | CARRIER IDENTIFICATION | | | |
| | CARRIER SELECTION INFORMATION | | | |
| | CHARGE NUMBER | | | |
| | GENERIC ADDRESS | | | |
| | ORIGINATING LINE INFORMATION | | | |
| | ORIGINAL CALLED NUMBER | | | |
| | REDIRECTING NUMBER | | | |
| | SERVICE CODE | | | |
| | TRANSIT NETWORK SELECTION | | | |
| | HOP COUNTER | | | |
| PASS ALONG | ALL PARAMETERS | | | |
| RELEASE | CAUSE INDICATOR | | | |
| | ACCESS TRANSPORT | | | |
| | AUTOMATIC CONGESTION CONTROL | | | |
| RELEASE COMPLETE | N/A | | | |
| RESUME | SUSPEND/RESUME INDICATOR | | | |
| SUSPEND | SUSPEND/RESUME INDICATOR | | | |

*FIG. 20*

SYSTEM AND METHOD FOR TRANSPORTING A CALL IN A TELECOMMUNICATION NETWORK

RELATED APPLICATIONS

This Patent Application is a continuation of U.S. patent application Ser. No. 09/080,393, now U.S. Pat. No. 6,262,922 entitled "System And Method For Transporting A Call In A Telecommunication Network," filed on May 18, 1998, which is a continuation of U.S. patent application Ser. No. 08/754,846, filed on Nov. 22, 1996, now abandoned, and is assigned to the same entity as this Application, and are hereby incorporated by reference into this Application.

FEDERALLY SPONSORED RESEARCH OR DEVELOPMENT

Not applicable

MICROFICHE APPENDIX

Not applicable

FIELD OF THE INVENTION

The present invention relates to the field of telecommunication communications transport and processing.

SUMMARY OF THE INVENTION

The present invention is directed to a telecommunication system for transporting a call through an asynchronous transfer mode system. The telecommunication system comprises a first communication device adapted to transport a call in a time division multiplex format. The call has user communications and call signaling. The telecommunication system further comprises a second communication device adapted to receive the user communications. A signaling processor is included to receive the call signaling from the first communication device, to process the call signaling to select a connection to the second communication device, and to transport a first processor control message designating the selected connection.

The telecommunication system also comprises an interworking unit adapted to receive the first processor control message from the signaling processor and to receive the user communications from the first communication device. The interworking unit converts the user communications from the time division multiplex format to asynchronous transfer mode cells that identify the selected connection and transports the user communications to the second communication device over the selected connection. The interworking unit monitors the user communications for a call trigger and transports an interworking unit control message to the signaling processor notifying the signaling processor of the call trigger.

The signaling processor is adapted to receive the interworking unit control message and, in response thereto, to process the interworking unit control message to select a third connection to the third communication device. The signaling processor transports a third processor control message designating the third selected connection.

The interworking unit is further adapted to receive the interworking unit control message and, in response thereto, to process the interworking unit control message to process the user communications.

Still further, the present invention is directed to a call trigger system for transporting a call between a first communication and a second communication device through an asynchronous transfer mode system. The call has user communications. The system comprises an interworking unit adapted to receive the user communications from the first communication device on a first connection and to transport the user communications to the second communication device on a second connection. The interworking unit monitors the user communications to detect a call trigger and, upon detection of the call trigger, transports a first control message containing call trigger data.

The call trigger system further comprises a signaling processor adapted to receive the first control message and, in response thereto, to process the call trigger data to select a processing option, and to transport a second control message designating the selected processing option. The interworking unit receives the second control message and, in response thereto, interworks the user communications for the processing option.

In another aspect, the present invention is a telecommunication system for transporting a call through an asynchronous transfer mode system. The call has user communications. The system comprises a first communication device adapted to transport the call over a first connection and a second communication device adapted to receive the user communications from the first communication device over a second connection. The system further comprises a tone detector adapted to monitor the user communications to detect a tone in the user communications and to transport a tone detector control message containing tone data upon detecting the tone.

The telecommunication system also includes a signaling processor adapted to receive the tone detector control message and, in response thereto, to process the tone data to select a. processing option. The signaling processor transports a first control message designating the selected processing option. An interworking unit is included in the telecommunication system and is adapted to interwork the user communications between the first communication device and the second communication device, to receive the first control message from the signaling processor, and in response thereto, to interwork the user communications for the processing option.

In yet another aspect, the present invention is a system for transporting a call through an asynchronous transfer mode system. The call has user communications. The system comprises a first communication device adapted to transport the call over a first connection, a second communication device adapted to receive the user communications from the first communication device over a second connection.

The system further comprises an interworking unit adapted to interwork the communications between the first and second connections, to monitor the user communications to detect a call trigger in the user communications, and to transport an interworking unit control message containing call trigger data upon detecting the call trigger. The system also comprises a signaling processor adapted to receive the call data from the interworking unit and, in response thereto, to process the call trigger data to select a processing option. The signaling processor transports a first control message designating the selected processing option. The interworking unit is adapted to receive the user communications from the network, to receive the first control message from the signaling processor, and in response thereto, to interwork the user communications for the processing option.

In still another aspect, the present invention is directed to a method for transporting a call in an asynchronous transfer mode system. The call has user communications and call signaling. The method comprises processing the call signaling in a signaling processor to determine a selected first connection and transporting a first control message designating the selected first connection. The user communications are received in an interworking unit and interworked to asynchronous transfer mode cells that identify the selected first connection designated in the second processor control message. The user communications are monitored to detect a call trigger with call data. The call trigger data is processed to determine a processing option.

Still further, the present invention is a method for transporting a call in an asynchronous transfer mode system. The call has user communications. The method comprises monitoring the user communications to detect a call trigger with call trigger data. The call trigger data is processed to determine a processing option. A control message designating the selected connection is transported from a signaling processor. The user communications are received at an interworking unit and interworked for the processing option designated in the control message.

In yet another aspect, the present invention is a method for processing a call in an asynchronous transfer mode system. The call has user communications and call signaling. The method comprises processing the call signaling to select a connection over which the user communications are to be transported. The method further includes interworking the user communications on a call-by-call basis between a non-asynchronous transfer mode format and asynchronous transfer mode formatted cells that identify the selected connection, transporting the user communications over the selected connection, and monitoring the user communications to detect a call trigger having call trigger data. The call trigger data is processed to select a processing option for the user communications.

In still another aspect, the present invention is a system for processing a call from a first communication device in an asynchronous transfer mode system. The call has user communications and call signaling. The system comprises a second communication device adapted to receive the user communications and to process the user communications. The system includes an interworking unit adapted to receive the user communications from the first communication device, to convert the user communications to asynchronous transfer mode cells that identify a selected connection to the second communication device, and to transport the user communications to the second communication device. The interworking unit monitors the user communications to detect a call trigger and, upon detection of the call trigger, transports to the signaling processor an interworking unit control message notifying the signaling processor of the call trigger.

Further, the system includes a signaling processor adapted to receive the interworking unit control message and, in response thereto, to select a processing option to process the user communications. The signaling processor transports a processor control message designating the selected processing option. The signaling processor also selects the connection to the second communication device in response to the call signaling received in the signaling processor from the first communication device and notifies the interworking unit of the selected connection. Moreover, the second communication device is further adapted to receive the processor control message designating the selected processing option and to process the user communications according to the selected processing option.

DESCRIPTION OF THE DRAWINGS

FIG. 8 is a functional diagram of an interworking unit for use in a synchronous optical network system.

FIG. 9 is a functional diagram of an interworking unit for use in a synchronous digital hierarchy system.

FIG. 13 is a table diagram of a trunk circuit table used in the signaling processor of FIG. 12.

FIG. 14 is a table diagram of a trunk group table used in the signaling processor of FIG. 12.

FIG. 15 is a table diagram of an exception circuit table used in the signaling processor of FIG. 12.

FIG. 16 is a table diagram of an automated number index table used in the signaling processor of FIG. 12.

FIG. 17 is a table diagram of a called number table used in the signaling processor of FIG. 12.

FIG. 18 is a table diagram of a routing table used in the signaling processor of FIG. 12.

FIG. 19 is a table diagram of a treatment table used in the signaling processor of FIG. 12.

FIG. 20 is a table diagram of a message table used in the signaling processor of FIG. 12.

DETAILED DESCRIPTION OF THE PREFERRED EMBODIMENTS

Figure 1:
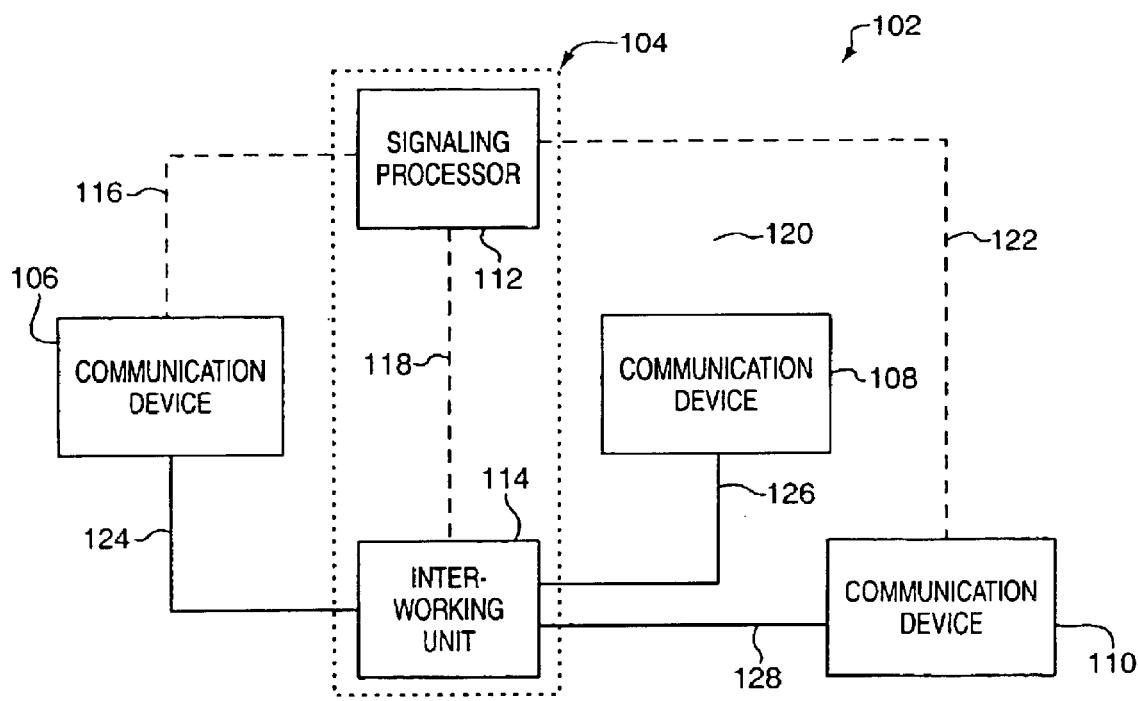
FIG. 1 is a block diagram of the system for detecting a call trigger.

Telecommunication systems provide services and processing for telecommunication calls between communication devices. Each call has call signaling and user communications. The user communications contain the caller's information, such as a voice communication or data communication, and they are communicated over a connection. Call signaling contains information that facilitates call processing, and it is communicated over a link. Call signaling, for example, contains information describing the called number and the calling number. Examples of call signaling are standardized signaling, such as SS7, C7, integrated services data network (ISDN), and digital private network signaling system (DPNSS), which are based on ITU recommendation Q.933.

A call can be transmitted from a communication device. A communication device can be, for example, customer premises equipment, a call processing platform, a switch, or any other device capable of initiating, handling, or terminating a call. Customer premises equipment can be, for example, a telephone, a computer, a facsimile machine, or a private branch exchange. A call processing platform can be, for example, a service platform or any other enhanced platform that is capable of processing calls.

The user communications and the call signaling may be transported by a communication device through an in-band transmission, such as superframe (SF) or extended superframe (ESF), over a time division multiplex (TDM) carrier such as a digital signal (DS) level communication line. Digital signal level zero (DS0), digital signal level one (DS1), and digital signal level three (DS3) are common designations that carry in-band communications. Other equivalent designations also carry in-band traffic. For example, European communication systems such as European level one (E1), European level 2 (E2), European level 3 (E3), and European level four (E4) are common designations that carry in-band communications.

In addition, call signaling and user communications may be transported out-of-band on separate transport paths, separate transport channels, separate transport connections, or separate transport media. These transports may be carried over DS level or equivalent European level media, as well as higher speed optical and electrical systems, such as synchronous optical network (SONET) and synchronous digital hierarchy (SDH). For example, signaling system 7 (SS7) and the European equivalent, C7, transport signaling traffic out-of-band. Moreover, narrowband systems such as ISDN and broadband systems such as broadband integrated services data network (B-ISDN), including B-ISDN over asynchronous transfer mode (ATM), transport call signaling and user communications out-of-band.

Broadband systems provide greater bandwidth than narrowband systems for calls, in addition to providing digital processing of the calls, error checking, and correction. ATM is one technology that is being used in conjunction with SONET and SDH to provide broadband call switching and call transport for telecommunication services.

ATM is a protocol that describes communication of user communications in ATM cells. Because the protocol uses cells, calls can be transported on demand for connection-oriented traffic, connectionless-oriented traffic, constant-bit traffic, variable-bit traffic including bursty traffic, and between equipment that either requires timing or does not require timing.

ATM systems handle calls over switched virtual paths (SVPs) and switched virtual circuits (SVCs). The virtual nature of ATM allows multiple communication devices to use a physical communication line at different times. This type of virtual connection more efficiently uses bandwidth, and thereby provides more cost efficient transport for customer calls, than permanent virtual circuits (PVCs) or other dedicated circuits.

The ATM system is able to connect a caller from an origination point to a destination point by selecting a connection from the origination point to the destination point. The connection contains a virtual path (VP) and a virtual channel (VC). A VC is a logical connection between two end points for the transfer of ATM cells. A VP is a logical combination of VCs. The ATM system designates the selected connection by specifying a virtual path identifier (VPI) that identifies the selected VP and a virtual channel identifier (VCI) that identifies the selected VC within the selected VP. Because ATM connections are uni-directional, bi-directional communications in an ATM system usually require companion VPIs/VCIs.

The SONET and SDH protocols describe the physical media and protocols upon which the communication of ATM cells takes place. SONET includes optical transmission of optical carrier (OC) signals and electrical transmission of synchronous transport signals (STSs). SONET signals transmit at a base rate of 51.84 Mega-bits per second (Mbps) for optical carrier level one (OC-1) and synchronous transport signal level one (STS-1). Also transmitted are multiples thereof, such as an STS level three (STS-3) and an OC level three (OC-3) at rates of 155.52 Mbps and an STS level twelve (STS-12) and an OC level 12 (OC-12) at rates of 622.08 Mbps, and fractions thereof, such as a virtual tributary group (VTG) at a rate of 6.912 Mbps. SDH includes transmission of optical synchronous transport module (STM O) signals and electrical synchronous transport module (STM E) signals. SDH signals transmit at a base rate of 155.52 Mbps for synchronous transport module level one electrical and optical (STM-1 E/O). Also transmitted are multiples thereof, such as an STM level four electrical/optical (STM-4 E/O) at rates of 622.08 Mbps, and fractions thereof, such as a tributary unit group (TUG) at a rate of 6.912 Mbps.

Telecommunication systems require call setup information to initiate a connection between communication devices. The call setup uses information in the call signaling to make the correct connection between the communication devices so that the user communications can be transported across the connection between the communication devices.

Enhanced services may be required during call setup for call routing and call signaling processing. Such enhanced services are provided by service providers such as service platforms. The service platforms are used to provide interactive applications with communication devices via voice commands, tones, or in-band protocols such as facsimile protocols. The calls are connected to the service platform through a port on the service platform. Once a service platform interacts with the communication devices and obtains the information needed to complete the call routing or processing, the service platform typically is released from the call, and the port can be used to connect to another call.

However, some calls require processing of a call trigger in mid-call after the setup is complete and while the call is connected between communication devices. A call trigger is an event or signal that causes some call processing, call translation, or call routing to occur when trigger criteria is satisfied. For example, a call trigger could be a tone, such as a tone which occurs when the number five is pressed on a telephone keypad, some other dial pad, or other tone generating device. If a communication device such as, for example, a service platform, is receiving the call, and if the call trigger satisfies a criterion that is recognized by the communication device as being valid and causing some processing to occur, then the communication device, or the system controlling the communication device, can cause the processing to occur. For example, transmitting a tone, an on-hook signal, a voice command, or an in-band protocol could cause the call to be routed to another communication device or cause menu options to be transmitted to the communication device that is originating the call.

Unfortunately, many conventional systems require that the service platform remain connected to the call to detect a call trigger. Therefore, a system is needed to detect a call trigger without requiring a service platform to remain connected to the call.

The Embodiments of FIGS. 1–7

The system of the present invention allows calls to be released from a service provider, such as a service platform, after the service platform's interactive applications have been completed. Therefore, the service platform is not required to remain on the connection for the duration of the call to detect a call trigger. Thus, the interactive applications that require call triggers to initiate their implementation use fewer service platform ports because the service platform only needs to be in the call for the time period during which the interactive application is implemented. This time period is typically much shorter than the duration of the entire call.

FIG. 1 illustrates the use of a call trigger system in accordance with the present invention. In FIG. 1, a telecommunication system 102 has a call trigger system 104. The call trigger system 104 can receive one or more calls and route the calls to the appropriate device.

The call trigger system 104 interacts with a first communication device 106, a second communication device 108, and a third communication device 110. Each of the communication devices 106, 108, and 110 comprises customer premises equipment, a call processing platform, a switch, or any other device capable of initiating, handling, or terminating a call, including a telephone, a computer, a facsimile machine, a private branch exchange, a service platform, or an enhanced platform that is capable of processing calls. The call trigger system 104 contains a signaling processor 112 and an interworking unit 114. It will be appreciated that other communication devices may be included. However, the number of communication devices shown has been restricted for clarity.

Links are used to transport call signaling and control messages. The term "link" as used herein means a transmission media used to carry call signaling and control messages. For example, a link would carry call signaling or a device control message containing device instructions and data. A link can carry, for example, out-of-band signaling such as SS7, C7, ISDN, B-ISDN, GR-303, local area network (LAN), or data bus call signaling. A link can be, for example, an AAL5 data link, UDP/IP, ethernet, or DS0 over T1. In addition, a link, as shown in the figures, can represent a single physical link or multiple links, such as one link or a combination of links of ISDN, SS7, TCP/IP, or some other data link. The term "control message" as used herein means a control or signaling message, a control or signaling instruction, a control or signaling signal, or signaling instructions, whether proprietary or standardized, that convey information from one point to another.

Connections are used to transport user communications and other device information between the elements and devices of the telecommunication system 102. The term "connection" as used herein means the transmission media used to, carry user communications between communication devices or between the elements of the telecommunication system 102. For example, a connection could carry a user's voice, computer data, or other communication device data. A connection can be associated with either in-band communications or out-of-band communications.

A system of links and connections connect the elements of the telecommunication system 102. The signaling processor 112 communicates with the first communication device 106 through a link 116, with the interworking unit 114 through a link 118, with the second communication device 108 through a link 120, and with the third communication device 110 through a link 122. The interworking unit 114 communicates with the first communication device 106 over a connection 124, with the second communication device 108 over a connection 126, and with the third communication device 110 over a connection 128. It shall be appreciated that other links can extend from the signaling processor 112 to other systems, networks, or devices. In addition, other connections may extend from the interworking unit 114 or the communication devices 106, 108, and 110 to other systems, networks, or devices.

The signaling processor 112 accepts call signaling or control messages from, or transmits call signaling or control messages to, other elements or devices in the telecommunication system 102. The signaling processor 112 thereby controls call routing and call processing in the telecommunication system 102. One embodiment of the signaling processor 112 is discussed in more detail below.

The interworking unit 114 interworks connections on a call-by-call basis. The interworking unit 114 may be an ATM interworking multiplexer that interworks between the ATM format and other formats while providing multiplexing and demultiplexing functions, or it may be an ATM interworking unit that interworks between different types of ATM systems and provides domain addressing. In addition, the interworking unit 114 may be a unit with domain addressing capabilities only, an ATM multiplexer that provides multiplexing and demultiplexing functions for ATM cells, or other types of interworking units.

The interworking unit 114 accepts user communications from, and transports user communications to, the first communication device 106, the second communication device 108, and the third communication device 110. Preferably, the interworking unit 114 is an ATM interworking multiplexer that interworks between a first communication device 106 that communicates user communications in a TDM format over a DS0 and either a second or third communication device 108 or 110 that communicates user communications in the ATM format over a SONET pipe or an SDH pipe. However, it will be appreciated that the communication devices 106, 108, and 110 may be either TDM or ATM devices, and interworking can be completed between any formats. One type of interworking unit that is compatible with the present system is discussed more fully below.

The interworking unit 114 accepts control messages from, and sends control messages to, the signaling processor 112. The interworking unit 114 uses the information gained from the signaling processor's control message to identify the required interworking assignment so that the user communications are converted between the format that is compatible with the first communication device 106 and the formats that are compatible with the second or third communication devices 108 and 110.

The control message from the signaling processor 112 designates a selected connection between the first communication device 106 over its connection 124 and the second communication device 108 over its connection 126. Alternatively, the control message designates a selected connection between the first communication device 106 over its connection 124 and the third communication device 110 over its connection 128. Both of the connections are connected at the interworking unit 114.

For DS0 to ATM interworking, a selected connection is designated by a selected VPI/VCI for ATM formatted communications, or a selected DS0 for TDM communications. The interworking unit 114 interworks the user communications between the devices over the selected connection. Thus, for example, user communications can be converted between ATM VPI/VCIs and TDM DS0s. In such an example, user communications are mapped dynamically from selected VPI/VCIs to selected DS0s, and user communications are mapped dynamically from selected DS0s to selected VPI/VCIs.

Referring still to FIG. 1, the interworking unit 114 is a monitoring interworking unit. The monitoring interworking unit 114 is capable of detecting a call trigger in the user communications as the user communications enter the interworking unit. Generally, the interworking unit 114 detects the call trigger from TDM formatted user communications. Thus, where, for example, user communications are converted from a TDM format originating from the first communication device 106 over a DS0 connection 124 to the ATM format destined for a second communication device 108 over a SONET connection 126, the call trigger would be detected from the DS0 connection 124 as the user communications enter the interworking unit 114.

The interworking unit 114 can contain either hardware or software that detects the call trigger. Preferably, the interworking unit 114 has a digital signal processor, discussed hereafter, that is programmed to process the user communications and to detect the call trigger as the user communications pass through the interworking unit. For example, if the telecommunication system 102 uses a dual tone multi-frequency signal (DTMF, hereinafter "a tone") as a call trigger, the interworking unit 114 can be programmed through software in the digital signal processor to detect the tone during user communications processing. Alternately, a processor card can be installed in the interworking unit 114 to detect the call trigger.

The interworking unit 114 can be configured for multiple detection options. The interworking unit 114 can be configured to detect a call trigger, such as a tone, and strictly transmit the call trigger data to the signaling processor 112 without first processing the call trigger data. In this option, all call trigger data is sent to the signaling processor 112 without validation in screening.

Alternately, the interworking unit 114 can be configured to detect a call trigger, such as a tone, and transmit the call trigger data to the signaling processor 112 after processing the call trigger data to determine what the call trigger is thereby defining the type of call trigger and after completing validation and screening. In this second option, the interworking unit 114 could, for example, detect a tone as a call trigger, determine that the tone is a "3," and notify the signaling processor 112 that a tone "3" was received.

In addition, the interworking unit 114 can be configured to detect a call trigger, but to only accept and process call trigger data that is within a subset of call trigger data. In this instance, the interworking unit 114 completes call validation and screening. In this third option, the interworking unit 114 could, for example, only accept call trigger data that is a tone "3" or a tone "*" and transmit the call trigger data to the signaling processor 112 if the call trigger is valid.

If the interworking unit 114 detects a call trigger, it reports the detection to the signaling processor 112 in an interworking unit control message. The signaling processor 112 determines if the call trigger is a valid call trigger. If the call trigger is valid, then the signaling processor 112 determines what processing option is to be implemented in response to the call trigger. Processing options include implementing an interactive application in a service platform to process the user communications and selecting a connection to a third communication device 110 so that the user communications can be transported thereon.

For example, the user communications may be transported from a first communication device 106 over a connection 124, through the interworking unit 114, and to a second communication device 108 over a connection 126. When a call trigger is detected by the interworking unit 114, the interworking unit transmits an interworking unit control message containing the call trigger data associated with the call trigger, such as a tone, to the signaling processor 112. If the signaling processor 112 determines that the call trigger is valid, the signaling processor may transmit a processor control message to the interworking unit 114 instructing the interworking unit to route the user communications to the third communication device 110 over a selected connection 128.

Referring again to FIG. 1, the processing of a call in the preferred call trigger system 104, wherein, for example, the call is communicated between a TDM system and an ATM system, operates as follows. It will be appreciated that the following process description is exemplary, and many other types of interworking and call communications can occur.

A call is initiated from the first communication device 106. The call signaling is transported from the first communication device 106 to the signaling processor 112. The user communications are transported in a TDM format over a DS0 from the first communication device 106 to the interworking unit 114. The DS0 may be contained within a DS3 or other high speed carrier and directed to the interworking unit 114 by a digital cross connect (not shown).

The signaling processor 112 processes the call signaling. The signaling processor 112 reads the call characteristics such as the routing label, including the origination point code (OPC), the destination point code (DPC), the circuit identification code (CIC), or the signaling link selection (SLS). Based on the processing of the call characteristics in the call signaling, the signaling processor 112 determines what action is to be taken. Presently, the signaling processor 112 determines which communication device 108 or 110 to which the call is to be transported and, when a service platform is the communication device 108 or 110, which interactive application or other processing option the service platform can provide. In addition, the signaling processor 112 determines if the interworking unit 114 is to be configured to detect a call trigger and which subset of tones to process.

For example, based on the call signaling processing, the signaling processor 112 selects the connection 126 from the interworking unit 114 to the second communication device 108 for the user communications. The signaling processor 112 sends a processor control message to the interworking unit 114 designating the selected connection 126 and configuring the interworking unit to process a subset of tones as call triggers and to complete validation and screening. The signaling processor 112 also sends a processor control message to the selected second communication device 108 notifying the second communication device 108 that user communications will be transported to the second communication device over a selected connection 126.

Referring still to FIG. 1, the interworking unit 114 receives both the user communications from the first communication device 106 and the processor control message from the signaling processor 112. The interworking unit 114 converts the user communications from the TDM format to a format that is compatible with the second communication device 108. Generally, the user communications are converted to ATM cells that identify the selected connection 126. The ATM cells would identify the VPI/VCI of the selected connection 126 to the second communication device 108.

The interworking unit 114 transports the ATM cells over the selected connection 126 to the second communication device 108. Generally, a cross connect (not shown) is located between the interworking unit 114 and the second communication device 108. The cross connect receives the ATM cells from the interworkihg unit 114 and directs the ATM cells to the second communication device 108. The interworking from the first connection 124 to the selected connection 126, including the reception of the TDM formatted user communications over the first connection 124, the conversion of the user communications to ATM cells that identify the selected connection 126, and the transport of the ATM cells over the selected connection 126, occurs dynamically in real time.

It will be appreciated that the call can be initiated from the opposite direction such that the second communication device 108 initiates a call to the first communication device 106. In such a case, a process opposite of the one described above is used. In that case, the interworking unit 114 receives the user communications from the second communication device 108 over the connection 126. The interworking unit 114 also receives a processor control message from the signaling processor 112 designating a selected DS0 connection 124 to the selected first communication device 106. The interworking unit 114 then converts the ATM cells containing the user communications that are received from the connection 126 to user communications in the TDM format. The interworking unit 114 transports the converted user communications over the selected connection 124 to the first communication device 106.

At this point, the call setup is complete and the first communication device 106 and the second communication device 108 are interacting over the connection through the interworking unit 114. During the call, either the first communication device 116 or the second communication device 108 can initiate a call trigger.

The interworking unit 114 detects the call trigger in the user communications. Upon detecting the call trigger, the interworking unit 114 processes the call trigger data to determine if the call trigger is a valid call trigger. If the call trigger is not valid, no action is taken or an error signal is generated to the signaling processor 112. If the call trigger is valid and within the subset of call trigger tones, the interworking unit transmits an interworking unit control message to the signaling processor 112. The interworking unit control message contains the data and information in the call trigger.

The signaling processor 112 further processes the call trigger data to determine what processing option to implement in response to the call trigger. Typically, the processing options include connection selection for connection reassignment to forward a call to another communication device or implementation of an interactive application.

The signaling processor 112 may, for example, determine that the call is to be forwarded to the third communication device 110 in response to the call trigger. The signaling processor 112 then selects a connection 128 to the third communication device and transmits a processor control message to the interworking unit 114 requiring the interworking unit 114 to transport the user communications over the selected connection 128 to the third communication device 110.

The interworking unit 110 then converts the user communications received from the first communication device 106 to ATM cells that identify the selected connection 128. The ATM cells are transported to the third communication device 110 over the selected connection 126.

Figure 2:
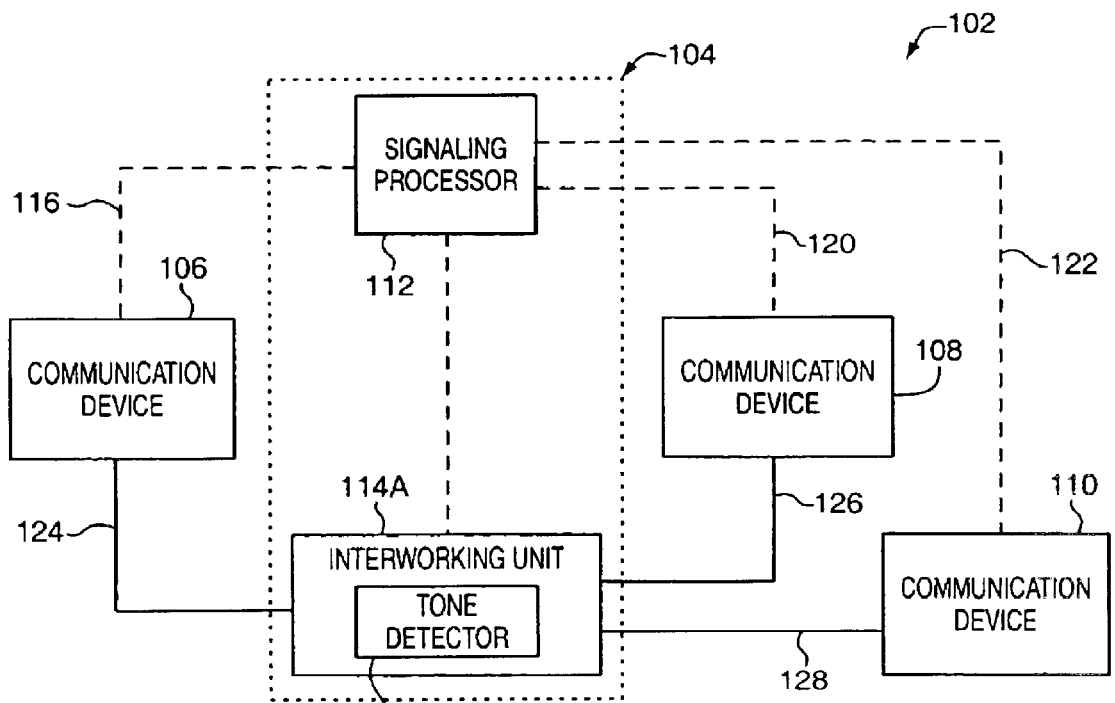
FIG. 2 is a block diagram of a system for detecting a tone with a tone detector internal to an interworking unit.

Illustrated in FIG. 2 is another embodiment of the call trigger system 104A of the present invention. In this embodiment, the interworking unit 114A has a tone detector 230. Tone detectors are known in the art and can be inserted as a card in the interworking unit 114A. Control messages, including data and information detected from a call trigger, would continue to be communicated to the signaling processor 112 through the link 118. Processor control messages would continue to be communicated to the interworking unit 114A from the signaling processor 112 through the link 118.

Figure 3:
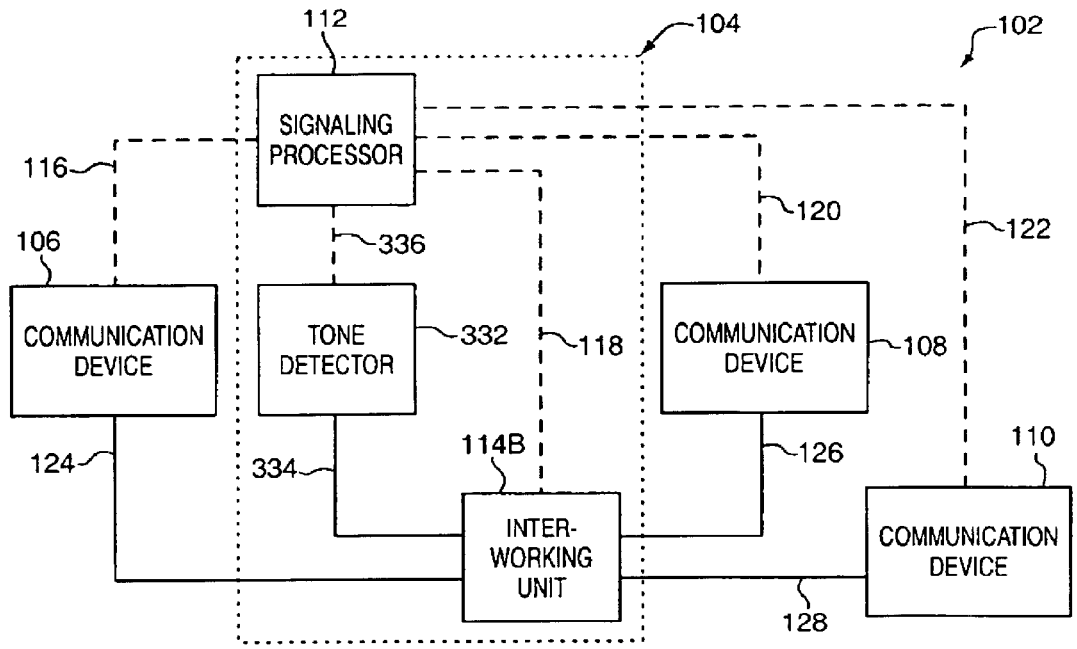
FIG. 3 is a block diagram of a system for detecting a tone with a tone detector external to an interworking unit.

In yet another embodiment, the call trigger system 104B illustrated in FIG. 3, the interworking unit 114B includes an external tone detector 332 attached to the backside of the interworking unit. In such a case, the interworking unit 114B is connected to the tone detector 332 via a bus 334 or other appropriate connection. The tone detector 332 communicates control messages in a tone detector control message to the signaling processor 112 via the link 336 and receives control messages from the signaling processor 122 via the link 336.

Figure 4:
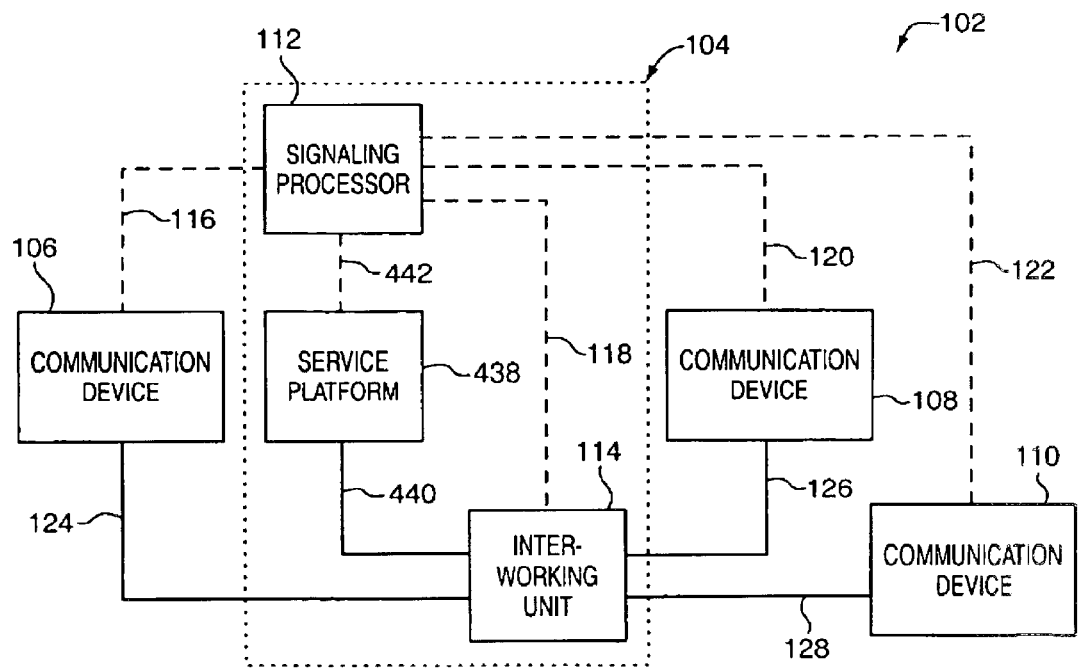
FIG. 4 is a block diagram of a system for processing a call trigger using a service platform.

A telecommunication system 102 comprising a service platform 438 is illustrated in FIG. 4. The service platform 438 provides interactive applications having processing options for the user communications. For example, the service platform 438 may be configured to perform conference bridging. The service platform 438 communicates with the interworking unit 114 over a connection 440 and with the signaling processor over the link 442. As stated above, when a call trigger is detected by the interworking unit 114, the interworking unit transmits an interworking unit control message containing the call trigger data associated with the call trigger, such as a tone, to the signaling processor 112.

If the signaling processor 112 determines that the call trigger is valid, the signaling processor may determine that a processing option in an interactive application residing on the service platform 438 is to be implemented to process the user communications. In such a case, the signaling processor 112 transmits a processor control message to the interworking unit 114 instructing the interworking unit to transport the user communications to the service platform 438 over the connection 440. At the same time, the signaling processor 112 transmits a processor control message to the service platform 438 over the link 442 instructing the service platform to process the user communications using a selected interactive application or other selected processing option.

The service platform 438 receives the user communications over the selected connection 440 and processes the user communications using the selected interactive application or another selected processing option. The service platform 438 then reports the results of the user communications processing back to the signaling processor 112 in a service platform control message.

Figure 5:
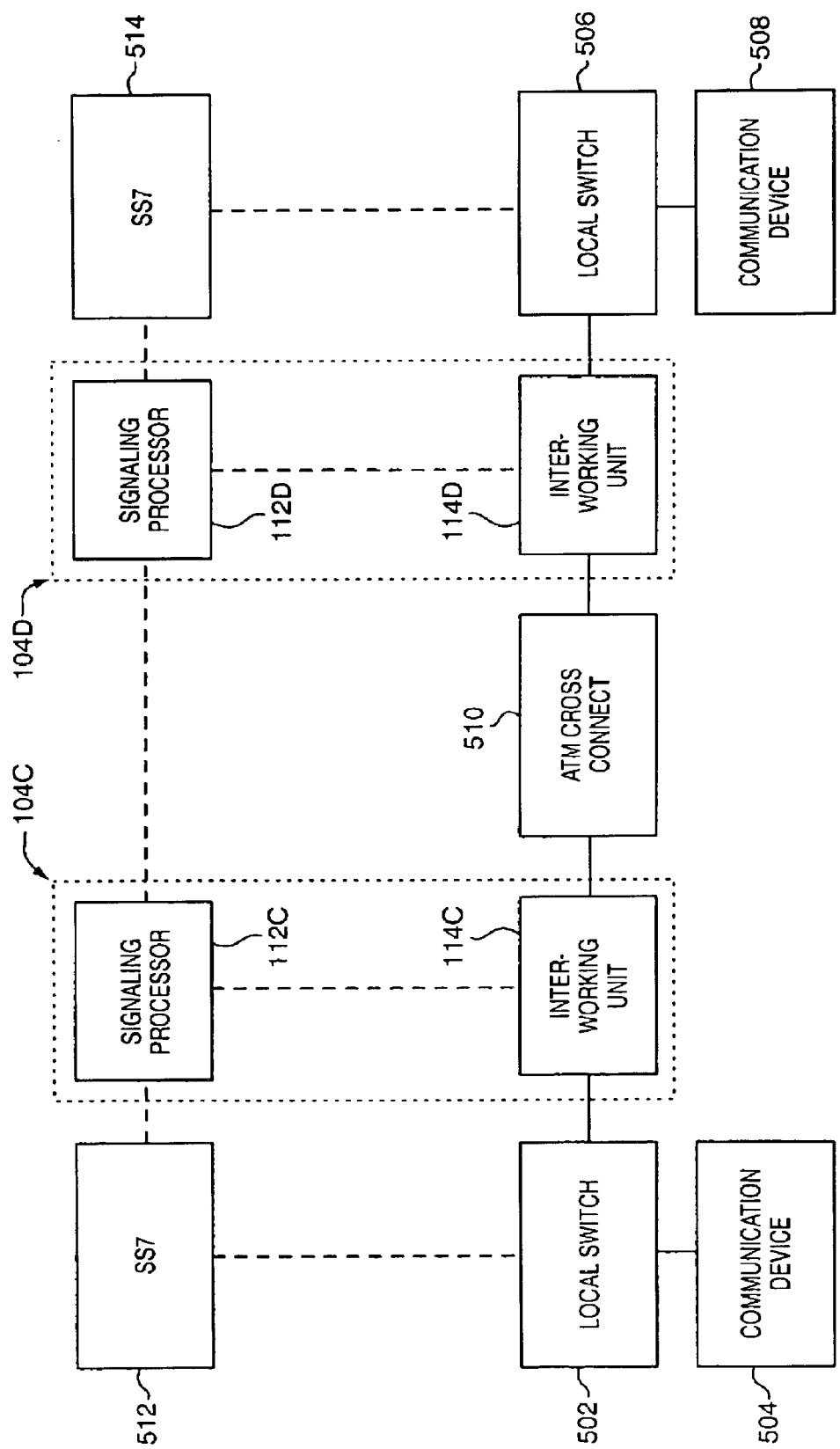
FIG. 5 is a block diagram of a system for detecting a call trigger in which the system interacts with local communication devices.

It will be appreciated that the call trigger system can handle calls from local communication devices as well as long distance communication devices. FIG. 5 illustrates a first call trigger system 104C and a second call trigger system 104D. The first call trigger system 104C handles calls from a local switch 502 that can originate or terminate at a local communication device 504. Likewise, the second call trigger system 104D handles calls from a local switch 506 that can originate or terminate at a local communication device 508.

The user communications of the call are interworked by the interworking units 114C and 114D. A cross connect 510 directs ATM communications of ATM cells between the interworking units 114C and 114D of the two call trigger systems 104C and 104D. SS7 devices 512 and 514 direct call signaling to the respective signaling processors 112C and 112D of the call trigger systems 104C and 104D.

Thus, it will be appreciated that a call can originate or terminate from either local communication device 504 or 508. In addition, either call trigger system 104C or 104D can detect a call trigger from the local communication devices 504 or 508 and process the call trigger.

Figure 6:
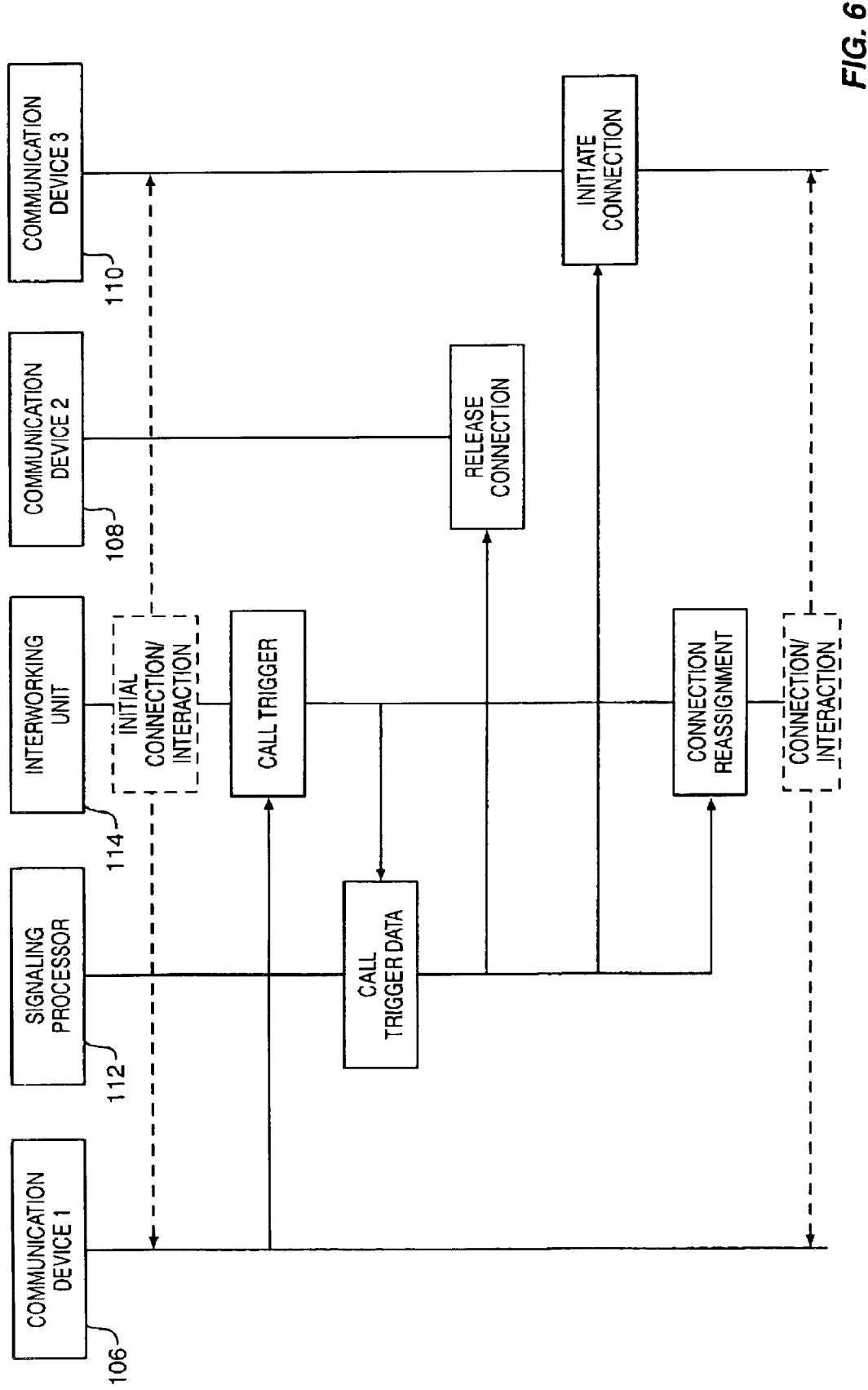
FIG. 6 is a process diagram of message sequences for a system for detecting a call trigger.

FIG. 6 procedurally illustrates the paths of the instruction transmissions for the call trigger processing and the control messages that are communicated between the various communication devices to process the user communications and the call trigger-in the telecommunication system 102 of FIG. 1. The instruction sequences illustrate the method for detecting a call trigger in an ATM system on the DS0 side of the connection and processing the call trigger after a call setup has been completed.

With reference to FIG. 6 and to FIG. 1, a call is connected between the first communication device 106 and the second communication device 108 such that interaction occurs between them. In this instance, the first communication device 106 initiates a call trigger. However, it will be appreciated that any element, including the second communication device 108 and the signaling processor 112, can initiate a call trigger.

The interworking unit 114 detects the call trigger and transmits the call trigger data to the signaling processor 112 in an interworking unit control message over the link 116 (FIG. 1). The interworking unit 114 processes the call trigger data and, upon determining call trigger validity, determines the call is to be rerouted to the third communication device 110 over a selected connection 128 (FIG. 1).

The signaling processor 112 transmits a release connection message to the second communication device 108 instructing the second communication device that the call is to be released. The signaling processor 112 also transmits a control message to the third communication device 110 instructing the third communication device to initiate a connection to the interworking unit 114. This will require the third communication device 110 to follow call setup procedures.

In addition, the signaling processor 112 transmits a processor control message to the interworking unit 114 reassigning the connection to the selected connection 128 to the third communication device 110. The processor control message contains the DS0 port to VPI/VCI port interworking information required by the interworking unit 114 to interwork the user communications to the designated port.

The interworking unit 114 releases the connection to the second communication device 108. The interworking unit 114 then converts the user communications to ATM cells that identify the selected VPI/VCI connection to the third communication device 110. The interworking unit 114 transports the ATM cells containing the user communications over the selected connection 128 to the third communication device 110. The call then is connected between the first communication device 106 and the third communication device 110 so that interaction occurs between them. Upon completion of user communications processing, or at the end of the call, either the first communication device 106 or the third communication device 110 can initiate a disconnect of the call.

Figure 7:
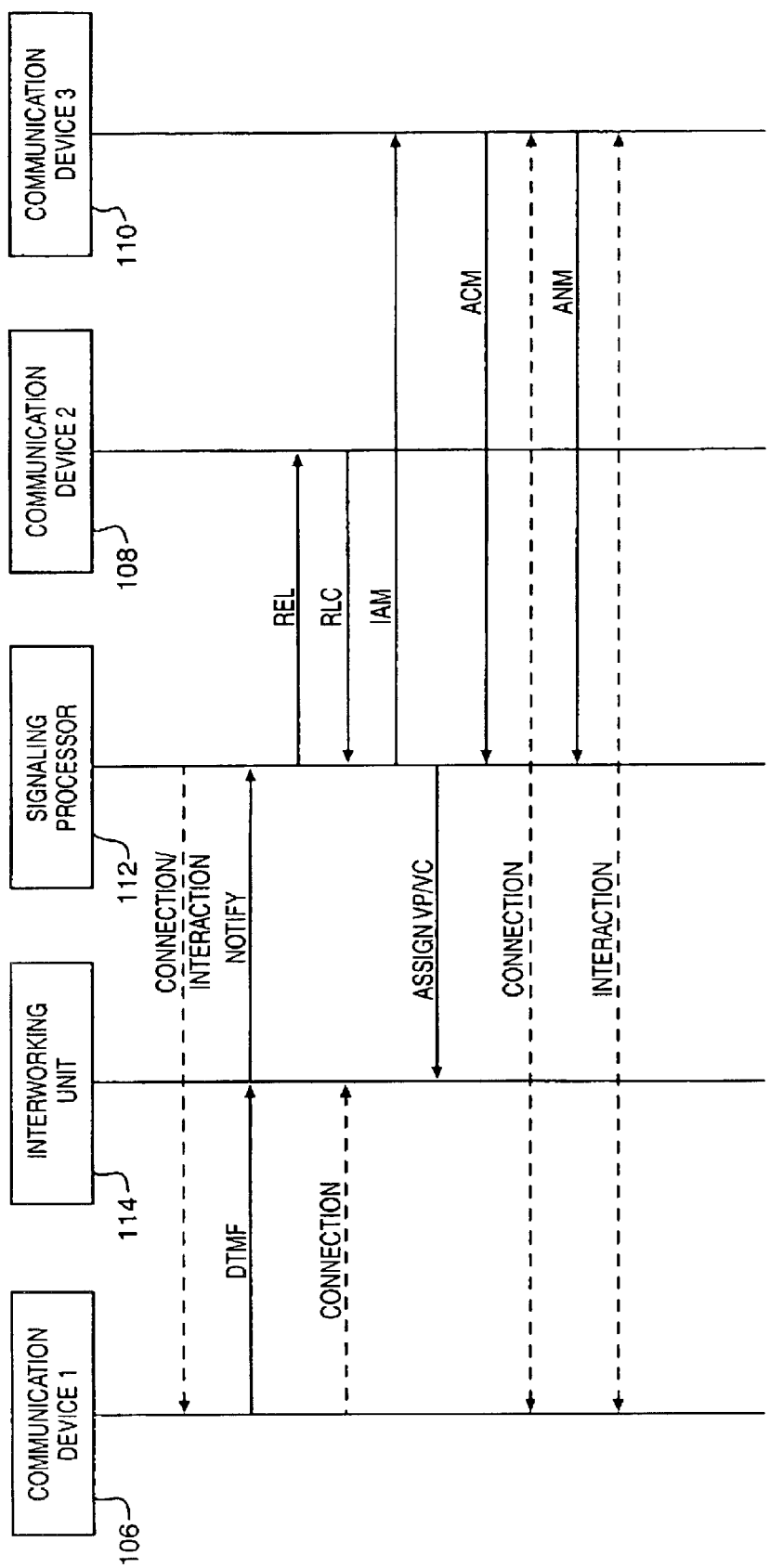
FIG. 7 is a message sequence chart for a system for detecting a call trigger.

FIG. 7 illustrates a sequence chart for the call trigger processing and the control messages that take place between the various communication devices to process the user communications and the call trigger in the telecommunication system 102 of FIG. 1. The message sequences illustrate the method for detecting a call trigger in an ATM system on the DS0 side of the connection and processing the call trigger after a call setup has been completed.

With reference to FIG. 7 and to FIG. 1, a call is connected between the first communication device 106 and the second communication device 108 such that interaction occurs between them. A call trigger in the form of a DTMF tone is initiated from the first communication device 106. The interworking unit 114 detects the DTMF tone and transmits a notify signal with the call trigger data to the signaling processor 112. After processing the call trigger data, the signaling processor 112 selects a connection. The signaling processor 112 sends a release message (REL) to the second communication device 108 to release the connection between the first communication device 106 and the second communication device. Upon receiving the REL message, the second communication device 108 sends a release complete (RLC) back to the signaling processor 112. At that point, the connection is released between the interworking unit 114 and the second communication device 108, but remains connected between the first communication device 106 and the interworking unit.

The signaling processor 112 sends an initial address message (IAM) to the third communication device 110. The signaling processor 112 generates a control message to the interworking unit 114 identifying the DS0 and the selected VPI/VCI to the third communication device 110. An address complete message (ACM) is sent from the third communication device 110 to the signaling processor 112. A connection then is complete between the first communication device 106 and the third communication device 110. If the third communication device 110 answers the call on the connection, the signaling processor 112 will receive an answer message (ANM) from the third communication device. At that point, interaction occurs between the first communication device 106 and the third communication device 110. Upon completion of the user communications processing, or at completion of the call, either of the communication devices 106 or 110, or in some instances the signaling processor 112, can initiate a disconnect.

The Interworking Unit Embodiments of FIGS. 8–9

FIG. 8 shows one embodiment of an ATM interworking multiplexer (mux) 802 that is suitable for the present invention, but other multiplexers that support the requirements of the invention are also applicable. The ATM interworking mux 802 has a control interface 804, an OC-N/STS-N interface 806, a DS3 interface 808, a DS1 interface 810, a DS0 interface 812, a signal processor 814, an ATM adaptation layer (AAL) 816, and an OC-M/STS-M interface 818.

The control interface 802 accepts control messages from the signaling processor 820. In particular, the control interface 804 identifies DS0 connections and virtual connection assignments in the control messages from the signaling processor 820. These assignments are provided to the AAL 816 for implementation.

The OC-N/STS-N interface 806, the DS3 interface 808, the DS1 interface 810, and the DS0 interface 812 each can accept calls, including user communications, from-a first communication device 822. Likewise, the OC-M/STS-M interface 818 can accept calls, including user communications, from a second communication device 824.

The OC-N/STS-N interface 806 accepts OC-N formatted communication signals, such as calls, and STS-N formatted communication signals and converts the communication signals from the OC-N or STS-N formats to the DS3 format. The DS3 interface 808 accepts communication signals in the DS3 format and converts the communication signals to the DS1 format. The DS3 interface 808 can accept DS3s from the OC-N/STS-N interface 806 or from an external connection. The DS1 interface 810 accepts the communication signals in the DS1 format and converts the communication signals to the DS0 format. The DS1 interface 810 can accept DS1s from the DS3 interface 808 or from an external connection. The DS0 interface 812 accepts communication signals in the DS0 format and provides an interface to the AAL 816. In addition, each interface may transmit signals in like manner to the communication device 822.

The OC-M/STS-M interface 818 is operational to accept ATM cells from the AAL 816 and to transmit the ATM cells over the connection to the communication device 824. The OC-M/STS-M interface 818 may also accept ATM cells in the OC or STS format and transmit them to the AAL 816.

The AAL 816 comprises both a convergence sublayer and a segmentation and reassembly (SAR) sublayer. The AAL 816 is operational to accept communication device information in the DS0 format from the DS0 interface 812 and to convert the communication device information into ATM cells. AALs are known in the art and information about AALs is provided by International Telecommunications Union (ITU) document I.363, which is hereby incorporated fully herein by reference. An AAL for voice communication signals is described in U.S. patent application Ser. No. 08/395,745, which was filed on Feb. 28, 1995, and entitled "Cell Processing for Voice Transmission," and which is incorporated herein by reference.

The AAL 816 obtains from the control interface 804 the virtual path identifier (VPI) and the virtual channel identifier (VCI) for each DS0 for each call connection. The AAL 816 also obtains the identity of the DS0 for each call (or the DS0s for an N×64 call). The AAL 816 then transfers the communication device information between the identified DS0 and the identified ATM virtual connection. An acknowledgment that the assignments have been implemented may be sent back to the signaling processor 820 if desired. Calls with multiple 64 Kilo-bits per second (Kbps) DS0s are known as N×64 calls. If desired, the AAL 816 can be configured to accept control messages through the control interface 804 for N×64 calls.

As discussed above, the ATM interworking mux 802 also handles calls in the opposite direction, that is, in the direction from the OC-M/STS-M interface 818 to the DS0 interface 812, including calls exiting from the DS1 interface 810, the DS3 interface 808, and the OC-N/STS-N interface 806. For this traffic, the VPI/VCI has been selected already and the traffic has been routed through the cross-connect (not shown). As a result, the AAL 816 only needs to identify the pre-assigned DS0 for the selected VPI/VCI. This can be accomplished through a look-up table. In alternative embodiments, the signaling processor 820 can provide this DS0-VPI/VCI assignment through the control interface 804 to the AAL 816.

A technique for processing VPI/VCIs is disclosed in U.S. patent application Ser. No. 08/653,852, which was filed on May 28, 1996, and entitled "Telecommunications System with a Connection Processing System," and which is incorporated herein by reference.

DS0 connections are bidirectional and ATM connections are typically unidirectional. As a result, two virtual connections in opposing directions will typically be required for each DS0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to invoke automatically this second VPI/VCI to provide a bi-directional virtual connection to match the bidirectional DS0 on the call.

In some embodiments, it may be desirable to incorporate digital signal processing capabilities at the DS0 level. For example, in the present invention, digital signal processing is used to detect the call trigger. It may also be desired to apply echo cancellation or encryption to selected DS0 circuits. In these embodiments, a signal processor 814 would be included either separately (as shown) or as a part of the DS0 interface 812. The signaling processor 820 would be configured to send control messages to the ATM interworking mux 802 to implement particular features on particular DS0 circuits.

FIG. 9 shows another embodiment of an ATM interworking multiplexer (mux) 902 that is suitable for the present invention. The ATM interworking mux 902 has a control interface 904, an STM-N electrical/optical (E/O) interface 906, an E3 interface 908, an E1 interface 910, an E0 interface 912, a signal processor 914, an ATM adaptation layer (AAL) 916, and an STM-M electrical/optical (E/O) interface 918.

The control interface 904 accepts control messages from the signaling processor 920. In particular, the control interface 904 identifies E0 connections and virtual connection assignments in the control messages from the signaling processor 920. These assignments are provided to the AAL 916 for implementation.

The STM-N E/O interface 906, the E3 interface 908, the E1 interface 910, and the E0 interface 912 each can accept calls, including user communications, from a first communication device 922. Likewise, the STM-M E/O interface 918 can accept calls, including user communications, from a second communication device 924.

The STM-N E/O interface 906 accepts STM-N electrical or optical formatted communication signals, such as calls, and converts the communication signals from the STM-N electrical or STM-N optical format to the E3 format. The E3 interface 908 accepts communication signals in the E3 format and converts the communication signals to the E1 format. The E3 interface 908 can accept E3s from the STM-N E/O interface 906 or from an external connection. The E1 interface 910 accepts the communication signals in the E1 format and converts the communication signals to the E0 format. The E1 interface 910 can accept E1s from the STM-N E/O interface 906 or the E3 interface 908 or from an external connection. The E0 interface 912 accepts communication signals in the E0 format and provides an interface to the AAL 916. In addition, each interface may transmit signals in a like manner to the communication device 922.

The STM-M E/O interface 918 is operational to accept ATM cells from the AAL 916 and to transmit the ATM cells over the connection to the communication device 924. The STM-M E/O interface 918 may also accept ATM cells in the STM-M E/O format and transmit them to the AAL 916.

The AAL 916 comprises both a convergence sublayer and a segmentation and reassembly (SAR) sublayer. The AAL 916 is operational to accept communication device information in the E0 format from the E0 interface 912 and to convert the communication device information into ATM cells.

The AAL 916 obtains from the control interface 904 the virtual path identifier and the virtual channel identifier for each call connection. The AAL 916 also obtains the identity of each call. The AAL 916 then transfers the communication device information between the identified E0 and the identified ATM virtual connection. An acknowledgment that the assignments have been implemented may be sent back to the signaling processor 920 if desired. If desired, the AAL 916 can be configured to accept control messages through the control interface 904 for N×64 calls.

As discussed above, the ATM interworking mux 902 also handles calls in the opposite direction, that is, in the direction from the STM-M E/O interface 918 to the E0 interface 912, including calls exiting from the E1 interface 910, the E3 interface 908, and the STM-N E/O interface 906. For this traffic, the VPI/VCI has been selected already and the traffic has been routed through the cross-connect (not shown). As a result, the AAL 916 only needs to identify the pre-assigned E0 for the selected VPI/VCI. This can be accomplished through a look-up table. In alternative embodiments, the signaling processor 920 can provide this VPI/VCI assignment through the control interface 904 to the AAL 916.

E0 connections are bidirectional and ATM connections typically are uni-directional. As a result, two virtual connections in opposing directions typically will be required for each E0. Those skilled in the art will appreciate how this can be accomplished in the context of the invention. For example, the cross-connect can be provisioned with a second set of VPI/VCIs in the opposite direction as the original set of VPI/VCIs. For each call, ATM interworking multiplexers would be configured to automatically invoke this second VPI/VCI to provide a bidirectional virtual connection to match the bidirectional E0 on the call.

In some instances, it may be desirable to incorporate digital signal processing capabilities at the E0 level. For example, in the present invention, digital signal processing is used to detect the call trigger. Also, it may be desirable apply echo cancellation. In these embodiments, a signal processor 914 would be included either separately (as shown) or as a part of the E0 interface 912. The signaling processor 920 would be configured to send control messages to the ATM interworking mux 902 to implement particular features on particular circuits.

The Signaling Processor of FIGS. 10–20

The signaling processor is referred to as a call/connection manager (CCM), and it receives and processes telecommunications call signaling and control messages to select connections that establish communication paths for calls. In the preferred embodiment, the CCM processes SS7 signaling to select connections for a call. CCM processing is described in a U.S. patent application having attorney docket number 1148, which is entitled "Telecommunication System," which is assigned to the same assignee as this patent application, and which is incorporated herein by reference.

In addition to selecting connections, the CCM performs many other functions in the context of call processing. It not only can control routing and select the actual connections, but it can also validate callers, control echo cancelers, generate billing information, invoke intelligent network functions, access remote databases, manage traffic, and balance network loads. One skilled in the art will appreciate how the CCM described below can be adapted to operate in the above embodiments.

Figure 10:
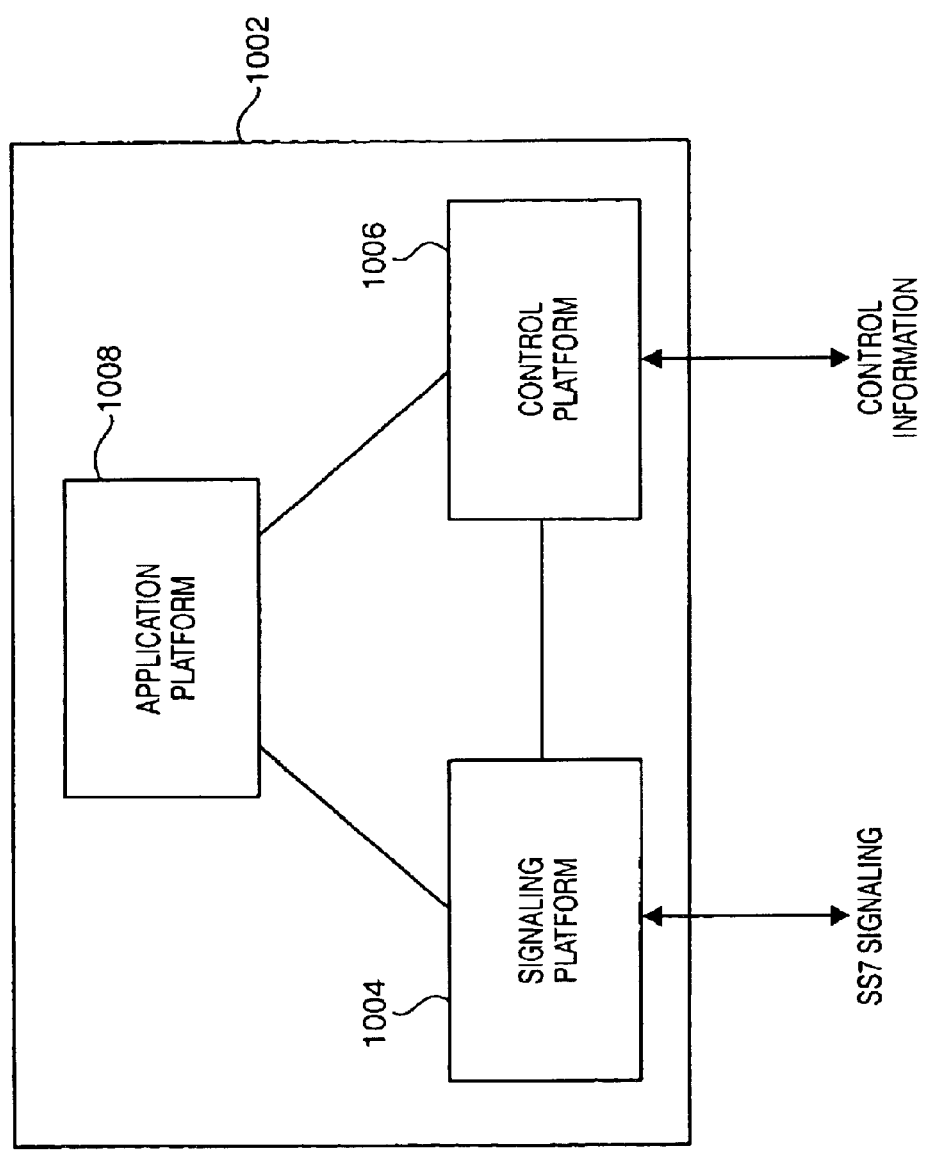
FIG. 10 is a block diagram of a signaling processor constructed in accordance with the present system.

FIG. 10 depicts a version of the CCM. Other versions are also contemplated. In the embodiment of FIG. 10, the CCM 1002 controls an ATM interworking multiplexer (mux) that performs interworking of DS0s and VPI/VCIs. However, the CCM may control other communications devices and connections in other embodiments.

The CCM 1002 comprises a signaling platform 1004, a control platform 1006, and an application platform 1008. Each of the platforms 1004, 1006, and 1008 is coupled to the other platforms.

The signaling platform 1004 is externally coupled to the SS7 systems—in particular to systems having a message transfer part (MTP), an ISDN user part (ISUP), a signaling connection control part (SCCP), an intelligent network application part (INAP), and a transaction capabilities application part (TCAP). The control platform 1006 is externally coupled to a mux control, an echo control, a resource control, billing, and operations.

The signaling platform 1004 comprises MTP levels 1–3, ISUP, TCAP, SCCP, and INAP functionality and is operational to transmit and receive the SS7 messages. The ISUP, SCCP, INAP, and TCAP functionality use MTP to transmit and receive the SS7 messages. Together, this functionality is referred as an "SS7 stack," and it is well known. The software required by one skilled in the art to configure an SS7 stack is commercially available, for example, from the Trillium company.

The control platform 1006 is comprised of various external interfaces including a mux interface, an echo interface, a resource control interface, a billing interface, and an operations interface. The mux interface exchanges messages with at least one mux. These messages comprise DS0 to VPI/VCI assignments, acknowledgments, and status information. The echo control interface exchanges messages with echo control systems. Messages exchanged with echo control systems might include instructions to enable or disable echo cancellation on particular DS0s, acknowledgments, and status information.

The resource control interface exchanges messages with external resources. Examples of such resources are devices that implement continuity testing, encryption, compression, tone detection/transmission, voice detection, and voice messaging. The messages exchanged with resources are instructions to apply the resource to particular DS0s, acknowledgments, and status information. For example, a message may instruct a continuity testing resource to provide a loopback or to send and detect a tone for a continuity test.

The billing interface transfers pertinent billing information to a billing system. Typical billing information includes the parties to the call, time points for the call, and any special features applied to the call. The operations interface allows for the configuration and control of the CCM 1002. One skilled in the art will appreciate how to produce the software for the interfaces in the control platform 1006.

The application platform 1008 is functional to process signaling information from the signaling platform 1004 in order to select connections. The identity of the selected connections are provided to the control platform 1006 for the mux interface. The application platform 1008 is responsible for validation, translation, routing, call control, exceptions, screening, and error handling. In addition to providing the control requirements for the mux, the application platform 1008 also provides requirements for echo control and resource control to the appropriate interface of the control platform 1006. In addition, the application platform 1008 generates signaling information for transmission by the signaling platform 1004. The signaling information might be ISUP, INAP, or TCAP messages to external network elements. Pertinent information for each call is stored in a call control block (CCB) for the call. The CCB can be used for tracking and billing the call.

The application platform 1008 operates in general accord with the Basic Call Model (BCM) defined by the ITU. An instance of the BCM is created to handle each call. The BCM includes an originating process and a terminating process. The application platform 1008 includes a service switching function (SSF) that is used to invoke the service control function (SCF). Typically, the SCF is contained in a service control point (SCP). The SCF is queried with TCAP or INAP messages. The originating or terminating processes will access remote databases with intelligent network (IN) functionality via the SSF function.

Software requirements for the application platform 1008 can be produced in specification and description language (SDL) defined in ITU-T Z.100. The SDL can be converted into C code. Additional C and C++ code can be added as required to establish the environment.

The CCM 1002 can be comprised of the above-described software loaded onto a computer. The computer can be an Integrated Micro Products (IMP) FT-Sparc 600 using the Solaris operating system and conventional database systems. It may be desirable to utilize the multi-threading capability of a Unix operating system.

From FIG. 10, it can be seen that the application platform 1008 processes signaling information to control numerous systems and facilitate call connections and services. The SS7 signaling is exchanged with external components through the signaling platform 1004, and control information is exchanged with external systems through the control platform 1006. Advantageously, the CCM 1002 is not integrated into a switch CPU that is coupled to a switching matrix. Unlike an SCP, the CCM 1002 is capable of processing ISUP messages independently of TCAP queries.

SS7 Message Designations

SS7 messages are well known. Designations for various SS7 messages commonly are used. Those skilled in the art are familiar with the following message designations:

```
ACM—Address Complete Message
ANM—Answer Message
BLO—Blocking
BLA—Blocking Acknowledgment
CPG—Call Progress
CRG—Charge Information
CGB—Circuit Group Blocking
CGBA—Circuit Group Blocking Acknowledgment
GRS—Circuit Group Reset
GRA—Circuit Group Reset Acknowledgment
CGU—Circuit Group Unblocking
CGUA—Circuit Group Unblocking Acknowledgment
CQM—Circuit Group Query
CQR—Circuit Group Query Response
CRM—Circuit Reservation Message
CRA—Circuit Reservation Acknowledgment
CVT—Circuit Validation Test
CVR—Circuit Validation Response
CFN—Confusion
COT—Continuity
CCR—Continuity Check Request
EXM—Exit Message
INF—Information
INR—Information Request
IAM—Initial Address
LPA—Loop Back Acknowledgment
PAM—Pass Along
REL—Release
RLC—Release Complete
RSC—Reset Circuit
RES—Resume
SUS—Suspend
UBL—Unblocking
UBA—Unblocking Acknowledgment
UCIC—Unequipped Circuit Identification Code.
```

CCM Tables

Call processing typically entails two aspects. First, an incoming or "originating" connection is recognized by an originating call process. For example, the initial connection that a call uses to enter a network is the originating connection in that network. Second, an outgoing or "terminating" connection is selected by a terminating call process. For example, the terminating connection is coupled to the originating connection in order to extend the call through the network. These two aspects of call processing are referred to as the originating side of the call and the terminating side of the call.

Figure 11:
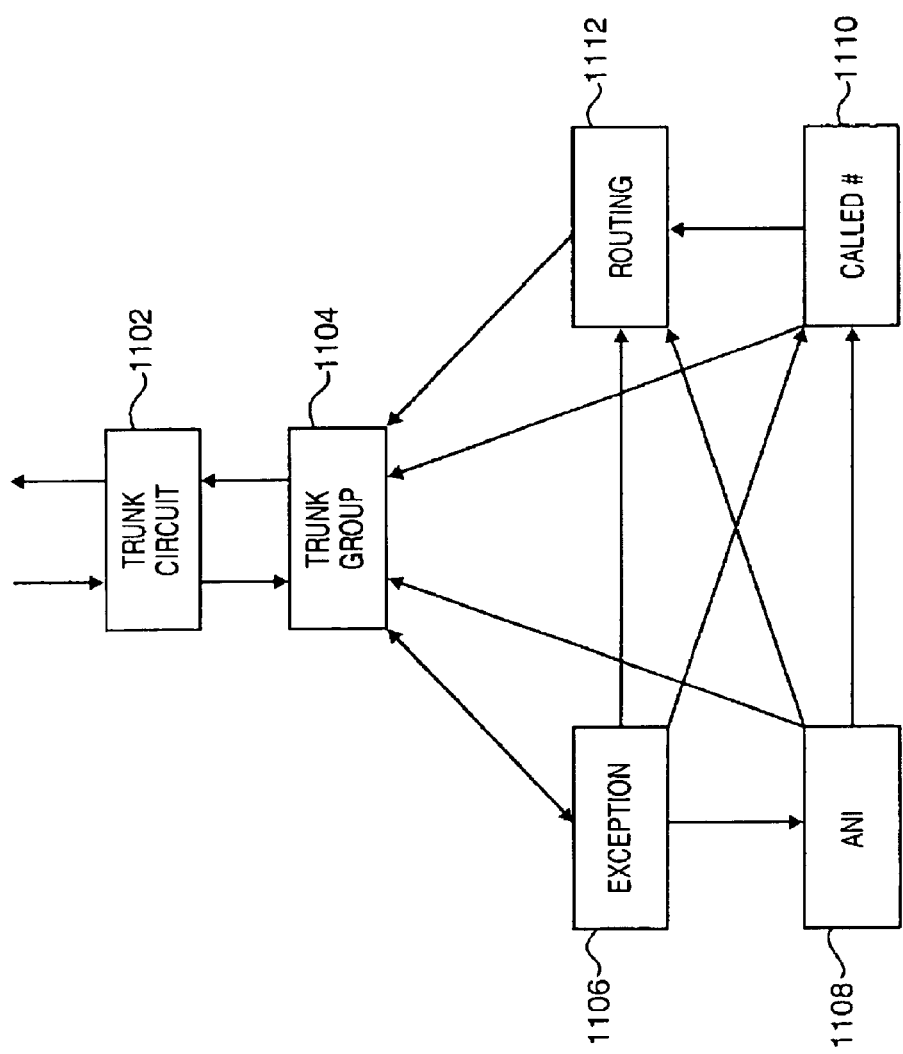
FIG. 11 is a block diagram of a data structure having tables that are used in the signaling processor of FIG. 10.

FIG. 11 depicts a data structure used by the application platform 1008 to execute the BCM. This is accomplished through a series of tables that point to one another in various ways. The pointers are typically comprised of next function and next index designations. The next function points to the next table, and the next index points to an entry or a range of entries in that table. The data structure has a trunk circuit table 1102, a trunk group table 1104, an exception table 1106, an ANI table 1108, a called number table 1110, and a routing table 1112.

The trunk circuit table 1102 contains information related to the connections. Typically, the connections are DS0 or ATM connections. Initially, the trunk circuit table 1102 is used to retrieve information about the originating connection. Later, the table is used to retrieve information about the terminating connection. When the originating connection is being processed, the trunk group number in the trunk circuit table 1102 points to the applicable trunk group for the originating connection in the trunk group table 1104.

The trunk group table 1104 contains information related to the originating and terminating trunk groups. When the originating connection is being processed, the trunk group table 1104 provides information relevant to the trunk group for the originating connection and typically points to the exception table 1106.

The exception table 1106 is used to identify various exception conditions related to the call that may influence the routing or other handling of the call. Typically, the exception table 1106 points to the ANI table 1108. Although, the exception table 1106 may point directly to the trunk group table 1104, the called number table 1110, or the routing table 1112.

The ANI table 1108 is used to identify any special characteristics related to the caller's number. The caller's number is commonly known as automatic number identification (ANI). The ANI table 1108 typically points to the called number table 1110. Although, the ANI table 1108 may point directly to the trunk group table 1104 or the routing table 1112.

The called number table 1110 is used to identify routing requirements based on the called number. This will be the case for standard telephone calls. The called number table 1110 typically points to the routing table 1112. Although, it may point to the trunk group table 1104.

The routing table 1112 has information relating to the routing of the call for the various connections. The routing table 1112 is entered from a pointer in either the exception table 1106, the ANI table 1108, or the called number table 1110. The routing table 1112 typically points to a trunk group in the trunk group table 1104.

When the exception table 1106, the ANI table 1108, the called number table 1110, or the routing table 1112 point to the trunk group table 1104, they effectively select the terminating trunk group. When the terminating connection is being processed, the trunk group number in the trunk group table 1104 points to the trunk group that contains the applicable terminating connection in the trunk circuit table 1104.

The terminating trunk circuit is used to extend the call. The trunk circuit is typically a VPI/VCI or a DS0. Thus it can be seen that by migrating through the tables, a terminating connection can be selected for a call.

Figure 12:
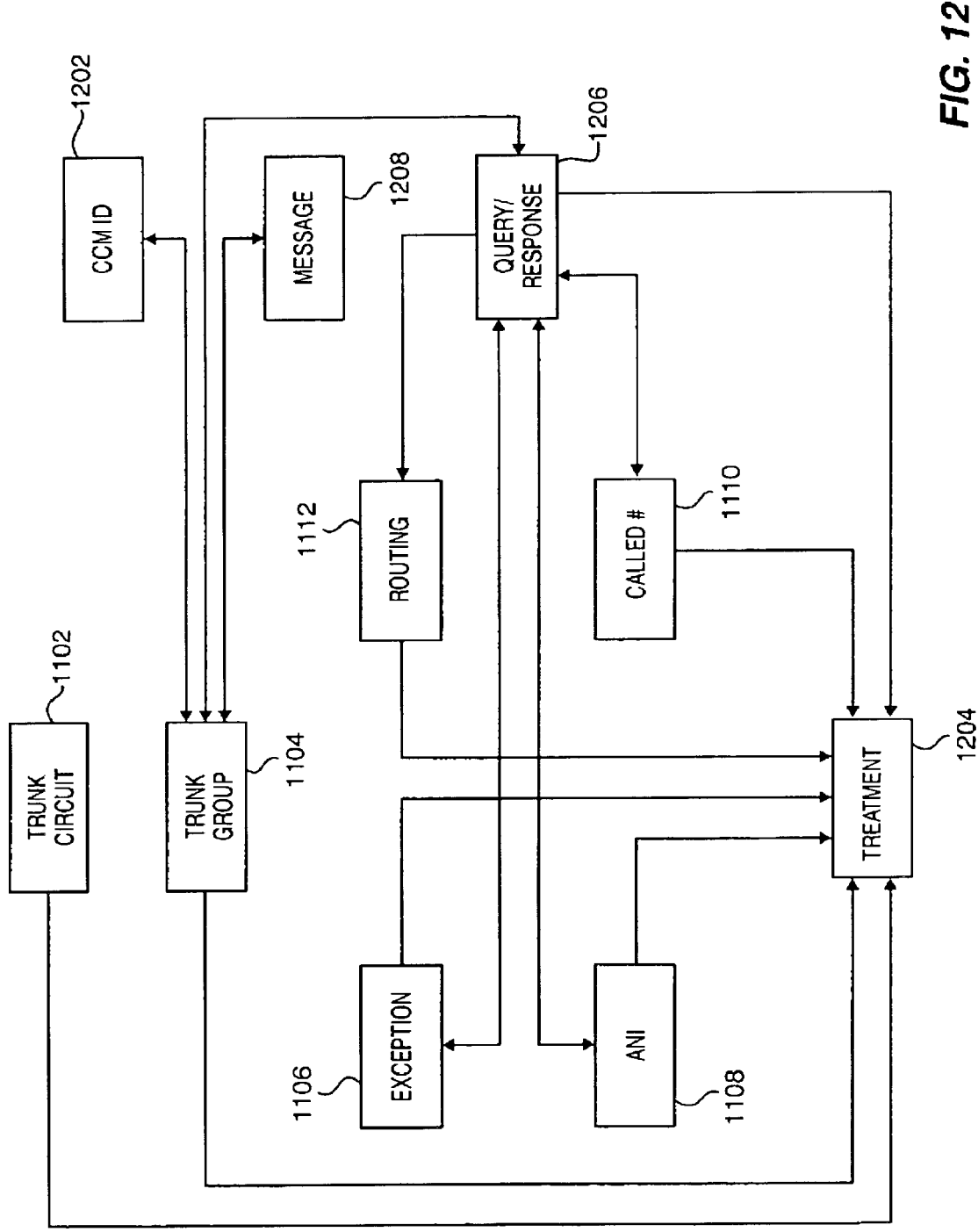
FIG. 12 is a block diagram of additional tables that are used in the signaling processor of FIG. 11.

FIG. 12 is an overlay of FIG. 11. The tables from FIG. 11 are present, but for clarity, their pointers have been omitted. FIG. 12 illustrates additional tables that can be accessed from the tables of FIG. 11. These include a CCM ID table 1202, a treatment table 1204, a query/response table 1206, and a message table 1208.

The CCM ID table 1202 contains various CCM SS7 point codes. It can be accessed from the trunk group table 1104, and it points back to the trunk group table 1104.

The treatment table 1204 identifies various special actions to be taken in the course of call processing. This will typically result in the transmission of a release message (REL) and a cause value. The treatment table 1204 can be accessed from the trunk circuit table 1102, the trunk group table 1104, the exception table 1106, the ANI table 1108, the called number table 1110, the routing table 1112, and the query/response table 1206.

The query/response table 1206 has information used to invoke the SCF. It can be accessed by the trunk group table 1104, the exception table 1106, the ANI table 1108, the called number table 1110, and the routing table 1112. It points to the trunk group table 1104, the exception table 1106, the ANI table 1108, the called number table 1110, the routing table 1112, and the treatment table 1204.

The message table 1208 is used to provide instructions for messages from the termination side of the call. It can be accessed by the trunk group table 1104 and points to the trunk group table 1104.

FIGS. 13–20 depict examples of the various tables described above. FIG. 13 depicts an example of the trunk circuit table. Initially, the trunk circuit table is used to access information about the originating circuit. Later in the processing, it is used to provide information about the terminating circuit. For originating circuit processing, the associated point code is used to enter the table. This is the point code of the switch or CCM associated with the originating circuit. For terminating circuit processing, the trunk group number is used to enter the table.

The table also contains the circuit identification code (CIC). The CIC identifies the circuit which is typically a DSO or a VPI/VCI. Thus, the invention is capable of mapping the SS7 CICs to the ATM VPI/VCI. If the circuit is ATM, the virtual path (VP) and the virtual channel (VC) also can be used for identification. The group member number is a numeric code that is used for terminating circuit selection. The hardware identifier identifies the location of the hardware associated with the originating circuit. The echo canceler (EC) identification (ID) entry identifies the echo canceler for the originating circuit.

The remaining fields are dynamic in that they are filled during call processing. The echo control entry is filled based on three fields in signaling messages: the echo suppresser indicator in the IAM or CRM, the echo control device indicator in the ACM or CPM, and the information transfer capability in the IAM. This information is used to determine if echo control is required on the call. The satellite indicator is filled with the satellite indicator in the IAM or CRM. It may be used to reject a call if too many satellites are used. The circuit status indicates if the given circuit is idle, blocked, or not blocked. The circuit state indicates the current state of the circuit, for example, active or transient. The time/date indicates when the idle circuit went idle.

FIG. 14 depicts an example of the trunk group table. During origination processing, the trunk group number from the trunk circuit table is used to key into the trunk table. Glare resolution indicates how a glare situation is to be resolved. Glare is dual seizure of the same circuit. If the glare resolution entry is set to "even/odd," the network element with the higher point code controls the even circuits, and the network element with the lower point code controls the odd circuits. If the glare resolution entry is set to "all," the CCM controls all of the circuits. If the glare resolution entry is set to "none," the CCM yields. The continuity control entry lists the percent of calls requiring continuity tests on the trunk group.

The common language location identifier (CLLI) entry is a Bellcore standardized entry. The satellite trunk group entry indicates that the trunk group uses a satellite. The satellite trunk group entry is used in conjunction with the satellite indicator field described above to determine if the call has used too many satellite connections and, therefore, must be rejected. The service indicator indicates if the incoming message is from a CCM (ATM) or a switch (TDM). The outgoing message index (OMI) points to the message table so that outgoing messages can obtain parameters. The associated number plan area (NPA) entry identifies the area code.

Selection sequence indicates the methodology that will be used to select a connection. The selection sequence field designations tell the trunk group to select circuits based on the following: least idle, most idle, ascending, descending, clockwise, and counterclockwise. The hop counter is decremented from the IAM. If the hop counter is zero, the call is released. Automatic congestion control (ACC) active indicates whether or not congestion control is active. If automatic congestion control is active, the CCM may release the call. During termination processing, the next function and index are used to enter the trunk circuit table.

FIG. 15 depicts an example of the exception table. The index is used as a pointer to enter the table. The carrier selection identification (ID) parameter indicates how the caller reached the network and is used for routing certain types of calls. The following are used for this field: spare or no indication, selected carrier identification code presubscribed and input by the calling party, selected carrier identification code presubscribed and not input by the calling party, selected carrier identification code presubscribed and no indication of input by the calling party, and selected carrier identification code not presubscribed and input by the calling party. The carrier identification (ID) indicates the network that the caller wants to use. This is used to route calls directly to the desired network. The called party number nature of address differentiates between 0+ calls, 1+ calls, test calls, and international calls. For example, international calls might be routed to a pre-selected international carrier.

The called party "digits from" and "digits to" focus further processing unique to a defined range of called numbers. The "digits from" field is a decimal number ranging from 1–15 digits. It can be any length and, if filled with less than 15 digits, is filled with 0s for the remaining digits. The "digits to" field is a decimal number ranging from 1–15 digits. It can be any length and, if filled with less than 15 digits, is filled with for the remaining digits. The next function and next index entries point to the next table which is typically the ANI table.

FIG. 16 depicts an example of the ANI table. The index is used to enter the fields of the table. The calling party category differentiates among types of calling parties, for example, test calls, emergency calls, and ordinary calls. The calling party charge number entry nature of address indicates how the ANI is to be obtained. The following is the table fill that is used in this field: unknown, unique subscriber numbers, ANI not available or not provided, unique national number, ANI of the called party included, ANI of the called party not included, ANI of the called party includes national number, non-unique subscriber number, non-unique national number, non-unique international number, test line test code, and all other parameter values.

The "digits from" and "digits to" focus further processing unique to ANI within a given range. The data entry indicates if the ANI represents a data device that does not need echo control. Originating line information (OLI) differentiates among ordinary subscriber, multiparty line, ANI failure, station level rating, special operator handling, automatic identified outward dialing, coin or non-coin call using database access, 800\888 service call, coin, prison/inmate service, intercept (blank, trouble, and regular), operator handled call, outward wide area telecommunications service, telecommunications relay service (TRS), cellular services, private paystation, and access for private virtual network types of service. The next function and next index point to the next table which is typically the called number table.

FIG. 17 depicts an example of the called number table. The index is used to enter the fields of the table. The called number nature of address entry indicates the type of dialed number, for example, national versus international. The "digits from" and "digits to" entries focus further processing unique to a range of called numbers. The processing follows the processing logic of the "digits from" and "digits to" fields in FIG. 15. The next function and next index point to the next table which is typically the routing table.

FIG. 18 depicts an example of the routing table. The index is used to enter the table. The transit network selection (TNS) network identification (ID) plan indicates the number of digits to use for the CIC. The transit network selection "digits from" and "digits to" fields define the range of numbers to identify an international carrier. The circuit code indicates the need for an operator on the call. The next function and next index entries in the routing table are used to identify a trunk group. The second and third next function/ index entries define alternate routes. The third next function entry can also point back to another set of next functions in the routing table in order to expand the number of alternate route choices. The only other entries allowed are pointers to the treatment table. If the routing table points to the trunk group table, then the trunk group table typically points to a trunk circuit in the trunk circuit table. The yield from the trunk circuit table is the terminating connection for the call.

It can be seen from FIGS. 13–18 that the tables can be configured and relate to one another in such a way that call processes can enter the trunk circuit table for the originating connection and can traverse through the tables by keying on information and using pointers. The yield of the tables is typically a terminating connection identified by the trunk circuit table. In some cases, treatment is specified by the treatment table instead of a connection. If, at any point during the processing, a trunk group can be selected, processing may proceed directly to the trunk group table for terminating circuit selection. For example, it may be desirable to route calls from a particular ANI over a particular set of trunk groups. In this case, the ANI table would point directly to the trunk group table, and the trunk group table would point to the trunk circuit table for a terminating circuit. The default path through the tables is: trunk circuit, trunk group, exception, ANI, called number, routing, trunk group, and trunk circuit.

FIG. 19 depicts an example of the treatment table. Either the index or the message received cause number are filled and are used to enter the table. If the index is filled and used to enter the table, the general location, coding standard, and cause value indicator are used to generate an SS7 REL. The message received cause value entry is the cause value in a received SS7 message. If the message received cause value is filled and used to enter the table, then the cause value from that message is used in a REL from the CCM. The next function and next index point to the next table.

FIG. 20 depicts an example of the message table. This table allows the CCM to alter information in outgoing messages. Message type is used to enter the table, and it represents the outgoing standard SS7 message type. The parameter is the pertinent parameter within the outgoing SS7 message. The indexes point to various entries in the trunk group table and determine if parameters can be unchanged, omitted, or modified in the outgoing messages.

It shall be recognized that the system of the present invention provides the capability to use an interworking unit as a monitoring interworking unit to monitor a call for a call trigger during the entire duration of a call. When used in conjunction with a signaling processor, the system of the present invention can implement routing procedures or interactive applications at a service platform at any time during the call without requiring the service platform to remain connected to the call. The system more efficiently uses available connections and ports in the telecommunication network, especially those ports and connections to the service platforms.

Moreover, it will be appreciated that the combination of the signaling processor, the interworking unit, and a service platform can be used to emulate telecommunication switch services, such as services provided by remote switches and class five switches. This also reduces the number of switching ports and associated connection required in a telecommunication network.

Those skilled in the art will appreciate that variations from the specific embodiments disclosed above are contemplated by the invention. The invention should not be restricted to the above embodiments, but should be measured by the following claims.

What is claimed is:

1. A method for operating an interworking unit to hands user communications for a call from a first communication device, the method comprising:

receiving a first control message into the interworking unit indicating a first identifier for routing the call to a second communication device wherein a user places the call using a telephone number for the second communication device and wherein a signaling processor selects the first identifier based on the telephone number and transfers the first control message to the interworking unit;

receiving the user communications including voice communications into the interworking unit and in response to the first control message adding the first identifier to the user communications;

transferring the user communications including the voice communications from the interworking unit with the first identifier for routing the call to the second communication device;

after call setup and during the call, monitoring the user communication, to detect a call trigger;

transferring a trigger message from the interworking unit if the call trigger is detected;

receiving a second control message into the interworking unit indicating a second identifier for routing the call to a third communication device wherein the second control message is responsive to the trigger message;

in response to the second control message, adding the second identifier to the user communications; and transferring the user communications including the voice communications from the interworking unit with the second identifier for routing the call to the third communication device.

2. The method of claim 1 wherein monitoring the user communications to detect the call trigger comprises detecting a tone.

3. The method of claim 1 wherein monitoring the user communications to detect the call trigger comprises detecting a voice command.

4. The method of claim 1 wherein monitoring the user communications to detect the call trigger comprises detecting an on-hook signal.

5. The method of claim 1 further comprising collecting caller information from the user communications if the call trigger is detected.

6. The method of claim 1 further comprising collecting caller information from the user communications in response to the second control message.

7. The method of claim 1 further comprising canceling echo from the user communications.

8. The method of claim 1 further comprising canceling echo from the user communications in response to the first control message.

9. The method of claim 1 further comprising canceling echo from the user communications in response to the second control message.

10. The method of claim 1 further comprising encrypting the user communications.

11. The method of claim 1 further comprising encrypting the user communications in response to the first control message.

12. The method of claim 1 further comprising encrypting the user communications in response to control message.

13. An interworking unit for handling user communications for a call from a first communication device comprising:
- a control interface configured to receive a first control message indicating a first identifier for routing the call to a second communication device wherein a user places the call using a telephone number for the second communication device and wherein a signaling processor selects the first identifier based on the telephone number and transfers the first control message to the interworking unit;
- a first communication interface configured to receive the user communications including voice communications into the interworking unit;
- an adaption layer configured to add the first identifier indicated in the first control message to the user communications in response to the first control message;
- a second communication interface configured to transfer the user communications including the voice communications from the interworking unit with the first identifier for routing the call to the second communication device;
- the signaling processor configured to monitor the user communications to detect a call trigger after call setup and during the call;
- the control interface configured to transfer a trigger message from the interworking unit if the call trigger is detected and receive a second control message indicating a second identifier for routing the call to a third communication device;
- the adaption layer is configured to add the second identifier to the user communications in response to the second control message; and
- the second communication interface configured to transfer the user communications including the voice communications from the interworking unit with the second identifier for routing the call to the third communication device.

14. The interworking unit of claim 13 wherein the signaling processor is configured to detect a tone.

15. The interworking unit of claim 13 wherein the signaling processor is configured to detect a voice command.

16. The interworking unit of claim 13 wherein the signaling processor is configured to detect an on-hook.

17. The interworking unit of claim 13 wherein the signaling processor is configured to collect caller information from the user communications if the call trigger is detected.

18. The interworking unit of claim 13 wherein the signaling processor is configured to collect caller information from the user communications in response to the second control message.

19. The interworking unit of claim 13 wherein the signaling processor is configured to cancel echo from the user communications.

20. The interworking unit of claim 13 wherein the signaling processor is configured to cancel echo from the user communications in response to the second control message.

21. The interworking unit of claim 13 wherein the signaling processor is configured to encrypt the user communications.

22. The interworking unit of claim 13 wherein the signaling processor is configured to encrypt the user communications in response to the second control message.

* * * * *

UNITED STATES PATENT AND TRADEMARK OFFICE
CERTIFICATE OF CORRECTION

PATENT NO. : 6,904,060 B2
DATED : June 7, 2005
INVENTOR(S) : Tracy Lee Nelson, William Lyle Wiley and Albert D. DuRee It is certified that error appears in the above-identified patent and that said Letters Patent is hereby corrected as shown below:

Column 24,
Line 28, replace "1. A method for operating an interworking unit to hands" with
-- 1. A method for operating an interworking unit to handle --.

Column 25,
Line 24, replace "the user communications in response to control message." with
-- the user communications in response to the second control message. --.

Signed and Sealed this

Fourth Day of October, 2005

JON W. DUDAS
*Director of the United States Patent and Trademark Office*